United States Patent
Yeddula et al.

(10) Patent No.: US 11,575,765 B2
(45) Date of Patent: *Feb. 7, 2023

(54) CUSTOMIZABLE ROUTER FOR MANAGING TRAFFIC BETWEEN APPLICATION PROGRAMMING INTERFACES

(71) Applicant: Home Depot Product Authority, LLC, Atlanta, GA (US)

(72) Inventors: Ravichandra Yeddula, Acworth, GA (US); Mohamed M Nazeemudeen, Cumming, GA (US); Arumugaraja Selvaraj, Cumming, GA (US); Nagaraja R Kamireddy, Southlake, TX (US); J. Todd O'Connor, Round Rock, TX (US)

(73) Assignee: Home Depot Product Authority, LLC, Atlanta, GA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/166,608

(22) Filed: Feb. 3, 2021

(65) Prior Publication Data

US 2021/0160334 A1 May 27, 2021

Related U.S. Application Data

(63) Continuation of application No. 16/387,195, filed on Apr. 17, 2019, now Pat. No. 10,938,923.

(51) Int. Cl.
*H04L 67/51* (2022.01)
*G06F 16/955* (2019.01)
(Continued)

(52) U.S. Cl.
CPC .......... *H04L 67/51* (2022.05); *G06F 16/9566* (2019.01); *H04L 41/22* (2013.01);
(Continued)

(58) Field of Classification Search
None
See application file for complete search history.

(56) References Cited

U.S. PATENT DOCUMENTS

| 8,817,629 B2 | 8/2014 | Seetharaman et al. |
| 9,639,876 B1 | 5/2017 | Ross, Jr. et al. |

(Continued)

FOREIGN PATENT DOCUMENTS

| CN | 107872334 A | * | 4/2018 | ........... H04L 41/082 |
| CN | 109104368 A | * | 12/2018 | ........... H04L 45/306 |

(Continued)

OTHER PUBLICATIONS

Hofmann et al., "Microservices Best Practices for Java", Dec. 7, 2016, Red Books, Chapters 2-4 (Year: 2016).*

(Continued)

*Primary Examiner* — Davoud A Zand
(74) *Attorney, Agent, or Firm* — Greenberg Traurig, LLP

(57) ABSTRACT

A customizable router manages traffic between application programming interfaces (APIs) of microservice applications (apps) that make up various features of a website. Various datastores may also be used to store information, such as information related to certain products, pricing, users, etc. In order for the website to function properly, the microservice apps communicate with one another and with the datastores. The customizable router is used to manage and route traffic between the microservice apps and/or datastores. The customizable router may, for example, route a universal resource indicator (URI) request for a webpage of a website to particular versions or revisions of a microservice app based on rules established for the customizable router. For example, a certain percentage of traffic may be routed to a
(Continued)

first version of a microservice app, while a different percentage of traffic may be routed to a second version of the microservice app.

20 Claims, 17 Drawing Sheets

(51) Int. Cl.
| | |
|---|---|
| H04L 67/02 | (2022.01) |
| H04L 45/302 | (2022.01) |
| H04L 41/22 | (2022.01) |
| H04L 67/61 | (2022.01) |
| H04L 67/63 | (2022.01) |
| G06Q 30/06 | (2012.01) |

(52) U.S. Cl.
CPC .......... *H04L 45/306* (2013.01); *H04L 45/308* (2013.01); *H04L 67/02* (2013.01); *H04L 67/61* (2022.05); *H04L 67/63* (2022.05); *G06Q 30/0601* (2013.01)

(56) References Cited

U.S. PATENT DOCUMENTS

| | | |
|---|---|---|
| 2007/0112574 A1 | 5/2007 | Greene |
| 2010/0223364 A1 | 9/2010 | Wei |
| 2010/0299437 A1 | 11/2010 | Moore |
| 2013/0268633 A1 | 10/2013 | Richardson et al. |
| 2014/0379823 A1* | 12/2014 | Wilsher ................ H04L 12/287 709/206 |
| 2015/0207854 A1* | 7/2015 | Aiello ................... G06F 16/951 709/203 |
| 2015/0365393 A1* | 12/2015 | Shyamsunder ... G06F 16/24564 726/4 |
| 2016/0112521 A1* | 4/2016 | Lawson ................. H04L 67/02 709/227 |
| 2017/0046146 A1 | 2/2017 | Jamjoom et al. |
| 2017/0346830 A1 | 11/2017 | Goldfarb et al. |
| 2019/0087178 A1 | 3/2019 | Buehler et al. |
| 2019/0095541 A1* | 3/2019 | Shao ................... G06F 16/9566 |
| 2020/0296172 A1 | 9/2020 | Gunjal et al. |

FOREIGN PATENT DOCUMENTS

| | | |
|---|---|---|
| WO | 2004010248 A2 | 1/2004 |
| WO | 2013049236 A1 | 4/2013 |
| WO | 2013115822 A1 | 8/2013 |

OTHER PUBLICATIONS

ISA/US, International Search Report and Written Opinion issued on PCT/US2019/028142, dated Jul. 1, 2019, 11 pgs.

Parad, "Can UIs and Websites be Microservices?", Mar. 10, 2019, <https://dev.to/wparad/can-uis-and-websites-be-microservices-22gi>, 10 pgs.

* cited by examiner

CUSTOMIZABLE ROUTER FOR MANAGING TRAFFIC BETWEEN APPLICATION PROGRAMMING INTERFACES

CROSS-REFERENCE TO RELATED APPLICATION

This application is a continuation of U.S. patent application Ser. No. 16/387,195, filed Apr. 17, 2019, and titled "CUSTOMIZABLE ROUTER FOR MANAGING TRAFFIC BETWEEN APPLICATION PROGRAMMING INTERFACES," the entire contents of which are hereby incorporated by reference in their entirety.

BACKGROUND

Websites are used by individuals and entities all around the world. Websites may be accessed by electronic devices, such as personal computers, tablets, smart phones, etc. Some websites may be hosted or provided by a corporation. Such a website may be an electronic commerce, or e-commerce, website, where clients can view and/or purchase products, services, etc. via webpages of a website. Clients may be able to pay for and arrange delivery of a product through an e-commerce website. Clients may also be able to pay for and schedule services to be performed through an e-commerce website.

SUMMARY

An illustrative method of routing a website request includes receiving, from a client electronic device, a uniform resource indicator (URI) request for a webpage of a website. The website includes a plurality of microservice applications. The method further includes determining a first microservice application of the plurality of microservice applications to which to send a microservice request in response to the URI request. The first microservice application has at least a first version and a second version. The method further includes determining a rule applicable to the first microservice application. The method further includes routing the microservice request associated with the URI request to one of the first version or the second version based on the rule.

An illustrative method for changing how a website request is routed includes receiving, from a first client electronic device, a first uniform resource indicator (URI) request for a webpage of a website. The website includes a plurality of microservice applications. The method further includes determining a first microservice application of the plurality of microservice applications to which to send a first microservice request in response to the first URI request. The first microservice application has at least a first version and a second version. The method further includes determining a rule applicable to the first microservice application. The microservice requests are routed to the first version or the second version of the first microservice app based on the rule. The method further includes routing the first microservice request associated with the first URI request to one of the first version or the second version based on the rule. The method further includes receiving, from an administrator electronic device via a graphical user interface, a change to the rule adjusting how the microservice requests are routed to the first version or the second version of the first microservice app such that the rule is a changed rule. The method further includes receiving, from a second client electronic device after receiving the change, a second URI request for the webpage. The method further includes routing the second microservice request associated with the second URI request to one of the first version or the second version based on the changed rule.

An illustrative method for changing how a website request is routed includes receiving, from a first client electronic device, a first uniform resource indicator (URI) request for a webpage of a website. The website includes a plurality of microservice applications. The method further includes determining a first microservice application of the plurality of microservice applications to which to send a microservice request in response to the first URI request. The first microservice application has at least a first version. The method further includes routing the first microservice request associated with the first URI request to the first version of the first microservice app. The method further includes receiving a second version of the first microservice app. The method further includes receiving, from an administrator electronic device via a graphical user interface, a rule for routing microservice requests to the first version or the second version of the first microservice application. The method further includes receiving, from a second client electronic device after receiving the change, a second URI request for the webpage. The method further includes routing the second microservice request associated with the second URI request to one of the first version or the second version based on the rule.

DETAILED DESCRIPTION

Figure 1:
FIG. 1 is a block diagram view of an example system for routing traffic between application programming interfaces (APIs) of various microservice applications (apps), in embodiments.

The present disclosure includes systems, methods, and computer readable media for a customizable router for managing traffic between application programming interfaces (APIs). A website may include several microservice applications (apps) that make up various features of the website. For example, an e-commerce website may include various microservices apps, such as microservice apps for shopping cart, checkout, inventory management, product ratings/reviews, user accounts, shipping, and other functions. Various datastores may also be used to store information in a cloud computing system, such as information related to certain products, pricing, users, etc. In order for the website to function properly, the microservice apps communicate with one another and with various datastores, which may be used to store information in a cloud computing system, such as information related to certain products, pricing, users, etc. For example, a shopping cart microservice app may access information from user, pricing, and product datastores, and may communicate with a checkout and a shipping microservice app so that a visitor to the website can select and purchase products for delivery to their home. The microservice apps may communicate with the datastores and with one another using application program interfaces (APIs). Described herein are systems, methods, and computer readable media for customizable routers that may be used to manage the communications (i.e., traffic) between those APIs of each microservice app and/or each datastore. There are many advantages provided by a customizable router according to the present disclosure, which are also described herein.

An architecture using microservice apps on a cloud platform may be used to operate a website. In this way, the microservice apps run in an elastic and distributed nature. However, management of interactions of various microservice apps in a large hybrid/multi-cloud environment may be difficult. For example, rolling out new versions of a microservice app may be challenging, since multiple other microservice apps may rely on interactions with that microservice app. Disclosed herein is a customizable router that allows an administrator to quickly route or re-route traffic for a particular microservice app and/or version of a microservice app, such that the administrator may easily and quickly control and manage the flow of traffic between the APIs of various microservice apps. The customizable router also advantageously works with microservice apps of different types that communicate using different types of APIs. The customizable routers described herein further advantageously provide for robust dynamic routing capabilities that support intricate operational features like test and target operations for new app revisions by, for example, passing a percentage of traffic for a microservice app to a particular version or revision (e.g., AB testing, Canary releases, etc.). Although the term version is often used in the software development industry to distinguish apps that have more significant changes or differences from each other than an app that is a revision of another, the terms revision and version are used herein interchangeably. In addition, the customizable routers described herein may also be used to manage traffic between completely different microservice apps that are not versions or revisions of one another.

The customizable routers described herein may be used to intelligently control the traffic between microservices and their APIs, for example in a cloud-based architecture. In addition, the customizable routers may be associated with graphical user interfaces such as a control pane for setting routing rules advantageously provide for administrators to quickly onboard and configure rules for routing traffic to microservice apps and their respective versions, including new microservice apps and/or new versions of microservice apps. Other graphical user interfaces, such as a pane for monitoring performance metrics, are also disclosed and provide additional insight to an administrator of how the systems, methods, and computer readable media herein are functioning, and may provide insight for establishing new rules for routing traffic between microservice apps and their respective versions. Various rules that are implemented to route traffic may, for example, include splitting a percentage of traffic among multiple revisions of a microservice app or causing traffic to stick to a particular revision of a microservice app based on request header or internet protocol (IP) address. Other examples of rules for custom routing of traffic are described herein throughout. In various embodiments, rules may be defined by an administrator or may be automatically defined. For example, a customizable router may implement a rule upon determining that a microservice app and/or microservice app version are not functioning properly. The customizable routers described herein additionally provide for robust monitoring and logging capabilities that administrators may use to get deep insights on the health of any upstream and downstream services to which traffic is routed to and/or from by the customizable routers.

The term administrator is used herein to refer to a person that sets or adjusts rules for the customizable routers described herein, uploads or removes microservice apps or microservice app versions, has access to the graphical user interfaces described herein, and otherwise uses the systems, methods, and computer readable media described herein. Accordingly, an administrator electronic device is an electronic device used by an administrator to implement those various functionalities described herein with respect to customizable routers. The term user is used herein to refer to a person accessing a website comprising a microservice architecture using a client electronic device. For example, a user may, using a client electronic device, navigate to a webpage of a website (e.g., an e-commerce website) via an internet browser or other software application (e.g., a mobile phone app). As just one example, a user may cause their client device to send a uniform resource indicator (URI) (e.g., by clicking a hyperlink) to a cloud service architecture as described herein to access the website. The customizable routers described herein may then route traffic related to that URI request to serve up the webpage to the client electronic device using the various microservice apps that make up the cloud service architecture for the website. The routing performed by the customizable routers may not be apparent to the user or the client electronic device. In other words, the routing may advantageously occur without a visitor to the website even knowing the routing is taking place.

A first example of routing that may be performed by the customizable routers described herein is weighted routing, where traffic (communications, data requests, etc.) to a microservice app is weighted by percentage to different versions of that microservice app. That routing may also be made "sticky", where a user that is routed to a particular version is routed to that version in the future to keep their experience consistent.

As an example, a main microservice app may have alpha and beta versions that are being tested. In such an example, a rule may be established for the customizable router to route seventy (70) percent of users visiting/using a website to the main version of the microservice app, twenty (20) percent of users visiting/using the website to a beta version of the app, and ten (10) percent of users visiting/using the website to an alpha version of the app. These percentages may be referred to herein as weights for routing traffic. Particular clients/users of a website may be randomly assigned to use a version of the app while maintaining the customizable weights as best as possible. That is, when a user first interacts with a website in a way that invokes the microservice app for the first time, that user may be randomly assigned to use a particular version of the microservice app in a way that keeps the overall traffic routed to the different versions of the microservice app conforming to the weights according to the rule.

In various embodiments, a user that invokes the microservice app again may be routed to the same microservice app to keep that user's experience consistent. In other words, a routing that occurred for the user (e.g., the first-occurring routing for user) is made "sticky". In embodiments, the routing may be made sticky through an indicator stored on the client electronic device. For example, a cookie may be stored in associations with a browser on the client electronic device to indicate which version of an app a particular user has been routed to previously based on the customizable weights. In this way, if/when the user visits the website again, the user may be routed to the same version of the app that they were routed to previously. In this way, the user experience will not change drastically between visits (i.e., the user will not be exposed to different versions of a particular app each time they visit/use the website).

In various embodiments, the customizable routers described herein may also have rules for dynamic routing of traffic to various microservice apps and different versions of those apps based on one or more characteristics of a user, the client electronic device, a URI request, or other characteristic. For example, a characteristic may be related to a specific URI request or aspects related to or associated with a specific URI request (e.g., a header, cookie, IP address, etc.) may be used to determine how to route microservice traffic, rather than randomly assigning a client electronic device to use a microservice app version in adherence to a rule, such as a weighted rule. For example, information about a user (or client electronic device) may be determined and used to route a user to a particular version of an app. For example, cookies stored in the client electronic device, a user device's IP address, a user account, parameters or headers of a request, etc. may all indicate particular information about a user, such as geographic location or region, device or browser type, browsing history, etc. Any of this information may be used as input to one or more rules that determine how to route microservice app traffic for a particular user or client electronic device. For example, traffic related to a first geographic region may be routed to a first version of a microservice app, while traffic related to a second geographic region may be routed to a second version of a microservice app. In other words, rules of a customizable router may be configured to dynamically route a client electronic device to a particular version of an app based on the determined information about a user and/or their client electronic device.

In various embodiments, the customizable routers described herein may also have rules for experience-based routing. For example, an e-commerce website may be capable of presenting similar information in different ways, such as displaying the information for a first product in different contexts or using different interfaces. In this way, the user may have a different experience depending on the context or interface in which the information about the first product is displayed. The customizable routers described herein may be used to route users to different experience apps based on various rules, such as percentage weight factors that may be set as part of a rule for routing traffic. For example, requests could be routed dynamically to different experience apps based on characteristics defined in a rule, percentage weights defined by a rule, or according to any other method. In this way, users may be routed to different experiences using the customizable routers herein. As an example, a characteristic of the URI request (e.g., certain text of the URI) may be used to determine how to route traffic to an experience app. For example, the customizable router may determine that a URI request is related to a particular product or product category, and the customizable router may then route microservice requests related to that URI request to a particular experience app based on which product or product category the URI request is related to. In this way, a URI request related to a particular product or product category may be routed to a first experience app, while other URI requests not related to a particular product or product category may be routed to a second experience app based on a rule of a customizable router. Contents of the URI request may be used to identify a product and/or product category so that the customizable router properly routes the traffic based on an experience-based routing rule.

In various embodiments, the customizable routers described herein are may also be configured for real-time configuration management/resiliency. For example, to implement a new version of a microservice app, the new app version may be uploaded to a cloud-based architecture for a website without impacting prior versions of the app. Once the new app version is uploaded, a rule may be added or updated to route traffic to the new app. This rule change can be done quickly and easily, for example with a graphical user interface as described herein (e.g., as illustrated in and described with respect to FIGS. 7 & 8). As a result, the new version of the app may go live without rebooting any version of the app, reducing downtime and initial implementation time for the new version of the app.

In various embodiments, the customizable routers described herein may also have rules for traffic shaping. A server system that supports a website may be distributed (e.g., on a cloud server system). Accordingly, multiple instances of a microservice app and its various revisions may exist in multiple physical locations or regions within a distributed system. In such a system, a cloud based architecture for a website may have multiple instances (or have components that have multiple instances) across a cloud based system. This provides redundancy, reliability, etc. for a system. There may be multiple instances of microservice apps, customizable routers, datastores, or any other component of a cloud based architecture for a website. The instances may be grouped in different logical systems, may be grouped according to geographic regions where the servers that run the instances are located, or may be grouped in other ways. Customizable routers, as described herein, may route traffic for a system to instances of microservice apps that are performing better than others, for example if a certain geographic region of cloud servers is having availability and/or performance issues. An administrator may manually change the rules of the customizable routers to adjust for performance issues, or a customizable router may recognize issues automatically, and the customizable router may, in response to recognizing an issue, automatically adjust the rules applied by the customizable router.

For example, a cloud server system may be broken up into different geographical regions such as a west region, a central region, and an east region. At least one instance of a particular microservice app may exist in each region. A customizable router may direct traffic to a particular region of a cloud server system for a particular microservice app. The regions of the cloud server system may be monitored for errors, availability, and performance issues for specific microservice apps. When a particular app is having an issue in one region, customizable routers may route some or all of the traffic for that app to a different region to improve availability or service for users. Advantageously, using the customizable routers described herein, traffic can be monitored and custom routed on a microservice app version level, rather than monitoring and routing all traffic relating to a particular website or webpage request based on system wide performance information.

In various embodiments, the customizable routers described herein are may also be configured for high levels of observability. In particular, robust logging, metrics, and monitoring of how traffic is routed through the customizable routers described herein is possible. This can provide deep insights for a website with a microservices architecture. For example, a customizable router may route a request to a microservice app version according to a rule, and the microservice app version may respond accordingly. That response may also be routed by customizable router to wherever the response is supposed to go (e.g., end user, other microservice app, etc.). In this way, data received and/or transmitted by the customizable router may be collected (e.g., by the customizable router or by another computing device or process associated with the customizable router) to monitor how well microservice apps are functioning (e.g., how quickly a response is received, whether the response is correct, etc.). This provides valuable information for tracking how different microservice apps, different versions of microservices apps, and/or instances of different microservices apps are functioning. That information may also be advantageously aggregated to better understand system availability, throughput, latency, error rates, and more as described herein. Aggregated information may also be used to implement new rules, such as routing future traffic to microservice apps, microservice app versions, and/or microservice app instances that are performing better as described herein.

The embodiments described herein therefore provide for methods, systems, and computer readable media for a website architecture with enhanced performance. In various embodiments, graphical control elements or graphical user interfaces may also be provided that allow an administrator to further enhance the functioning of a website by monitoring aspects of the website and/or implementing rules for routing traffic as described herein. The various embodiments described herein therefore solve various internet-centric problems—providing a better functioning and quick website, implementing new versions of a website or aspects of a website, increasing reliability of a website, decreasing downtime of a website, providing better testing of aspects of a website, providing redundancies for aspects of a website that are easy to switch between without interrupting service to a user, and more—through methods and systems necessarily rooted in computer technology. The techniques described herein therefore advantageously provide improved functioning of a website accessed by a user. In addition, the methods and systems described herein provide improved graphical user interfaces. The graphical user interfaces described herein allow an administrator to quickly and easily monitor performance of granular aspects of a website and add, change, or remove rules for routing traffic between aspects of a website. In other words, the methods and systems herein provide for a particular manner of summarizing and presenting information by and on electronic devices, and include specific manners of displaying a limited set of relevant information to an administrator, rather than using conventional graphical user interface methods to display generic information on a computer. These graphical user interfaces advantageously allow an administrator user to see relevant data quickly and implement desired changes to rules quickly and easily. The customizable routers described herein also advantageously embody practical implementations of the rules for routing traffic described herein. Furthermore, the customizable routers advantageously may apply those rules in order to direct data flow, such as website traffic, and thereby improve the user experience and website functionality.

Accordingly, the customizable routers described herein may advantageously support varying revisions of a various microservice apps, including canary release models, and may also act as an experimentation platform for various features, content, etc. Canary releases are used to reduce the risk of introducing a new software version in production by gradually rolling out the change to a small subgroup of users, before rolling it out to the entire platform/infrastructure and making it available to all users. The customizable routers described herein provide for more granular testing of features, versions, etc. to groups of users that are highly controllable (e.g., control who to test features, revisions on specifically). The various systems and methods herein therefore provide for experimenting at a high level, with low switching costs and time to switch between tests, features, revisions, etc. This allows an administrator to experiment (A/B . . . Z test) different pages and features within pages to innovate on products and experiences. Additionally, metrics on how a test, page, feature, revision, etc. is functioning may be tracked, so that decisions based on how well certain aspects are functioning may be quickly made to direct more or fewer users to a particular aspect by changing a routing rule of a customizable router as described herein.

Reference will now be made in detail to embodiments of the invention, examples of which are illustrated in the accompanying drawings. First, with respect to FIGS. 1 and 2, example systems for providing customizable routers will be described. With respect to FIG. 3, an embodiment for routing a microservice request to a first version or second version of a microservice app according to a rule will be described. With respect to FIG. 4, an example customizable router will be described. With respect to FIG. 5, an example engine of a customizable router will be described. With respect to FIG. 6, an embodiment for multi-level sticky routing of a microservice request will be described. With respect to FIGS. 7 and 8, an example graphical user interface for displaying and implementing rules for customizable routers will be described. With respect to FIG. 9, an example graphical representation of displaying metrics related to a website with microservices in a cloud based architecture will be discussed. With respect to FIG. 10, an example of a cloud platform for monitoring performance metrics of a customizable router will be discussed. With respect to FIGS. 11-14, example systems and methods for experiential/experimental routing of microservice app traffic. With respect to FIGS. 15 and 16, an example rules engine that operates in conjunction with a customizable router to route microservice app traffic will be discussed. Finally, with respect to FIG. 17, an illustrative computing environment that may be used in conjunction with the methods and processes of this disclosure will be described.

FIG. 1 is a block diagram view of an example system 100 for routing traffic between application programming interfaces (APIs) of various microservice applications (apps), in embodiments. The system 100 includes a client electronic device 102 that may send requests, such as a URI request, to a website. There may be numerous other client electronic devices that send requests to the website, but only one is shown here. A request received from the client electronic device 102 may be handled and routed by an content delivery network (CDN) 104. For example, some requests from the client electronic device 102 may be of a first type and some requests may be of a second type. For example, a first type of request may be generated at the client electronic device from an internet browser application and a second type of request may be generated at the client electronic device through a mobile application that uses its own API protocol (e.g., a mobile app on a smart phone electronic device). For example, a URI of the first type may include the text https://www.website.com and a URI of the second type may include the text https://api.website.com. Accordingly, the CDN 104 may sort and route requests based on type to the appropriate portion of a cloud based architecture for a website that handles that type of request. Additionally or alternatively, a customizable router may handle requests of different types.

Accordingly, requests of a first type may be sent by the CDN 104 to a load balancer 106 and a customizable router 110. The customizable router 110 may exist in multiple instances on a cloud server system (e.g., on different regions of the cloud server system), so the load balancer 106 may be used to distribute requests across the multiple instances of the customizable router 110 (e.g., to east region and central region instances). The customizable router 110 may process the request using rules as described herein to route microservice requests to microservice app 118 and/or microservice app 119.

In the example of FIG. 1, the customizable router 110 routes microservice requests to two different microservice apps 118 and 119, but the customizable router 110 may route microservice requests to any number of microservice apps. The microservice apps 118 and 119 may be different microservice apps completely, or may be different versions of the same microservice app. As described herein, various rules may also cause the customizable router 110 to route microservice requests to different apps (e.g., different experience apps), additionally or alternatively to routing traffic between/to different versions of the same app. The microservice requests may also be different kinds of requests, such as requests for information, requests to delete information, requests to change information, and/or requests to write information.

The microservice apps 118 and 119 may also exist in multiple instances, for example on an east and central region of a cloud computing system. As described herein, the customizable router 110 may route microservice requests to different instances of a microservice app and/or version of a microservice app. In instances where the customizable router 110 is not determining an instance of a microservice app to which to route a request, load balancers 114 and 115 may be used to balance requests between different instances of the microservice apps 118 and 119. Responses to the microservice request from the microservice apps 118 and/or 119 (including from different instances of the microservice apps 118 and/or 119) may be routed back to the customizable router 110 and the client electronic device 102 so that the URI request from the client electronic device 102 may be fulfilled.

Similarly, requests from the client electronic device 102 of a second type may be routed to a customizable router 112 through a load balancer 108. The customizable router 112 may exist in multiple instances across a cloud server system, so the load balancer 108 may help balance request across those multiple instances. The customizable router 112 may function similarly to the customizable router 110, but for the second type of requests from the client electronic device 102. Similarly, the load balancers 116 and 117 may function similarly to the load balancers 114 and 115, but for the second type of requests from the client electronic device 102. Lastly, microservice apps 120 and 121 may function similarly to the microservice apps 118 and 119, but for the second type of requests from the client electronic device 102.

Although not shown in FIG. 1, microservice apps 118-121 may also send requests to other aspects of a cloud based architecture for a website, such as other microservice apps, datastores, etc. In such embodiments, load balancers and/or instances of a customizable router may also exist between the microservice apps 118-121 and the other aspects of the cloud based architecture to which requests are sent. An example of an embodiment where microservice apps send requests to one or more datastores is shown and described with respect to FIG. 2. An example of an embodiment where a microservice app sends a request to another microservice app with an intervening customizable router is shown and described with respect to FIG. 6.

Figure 2:
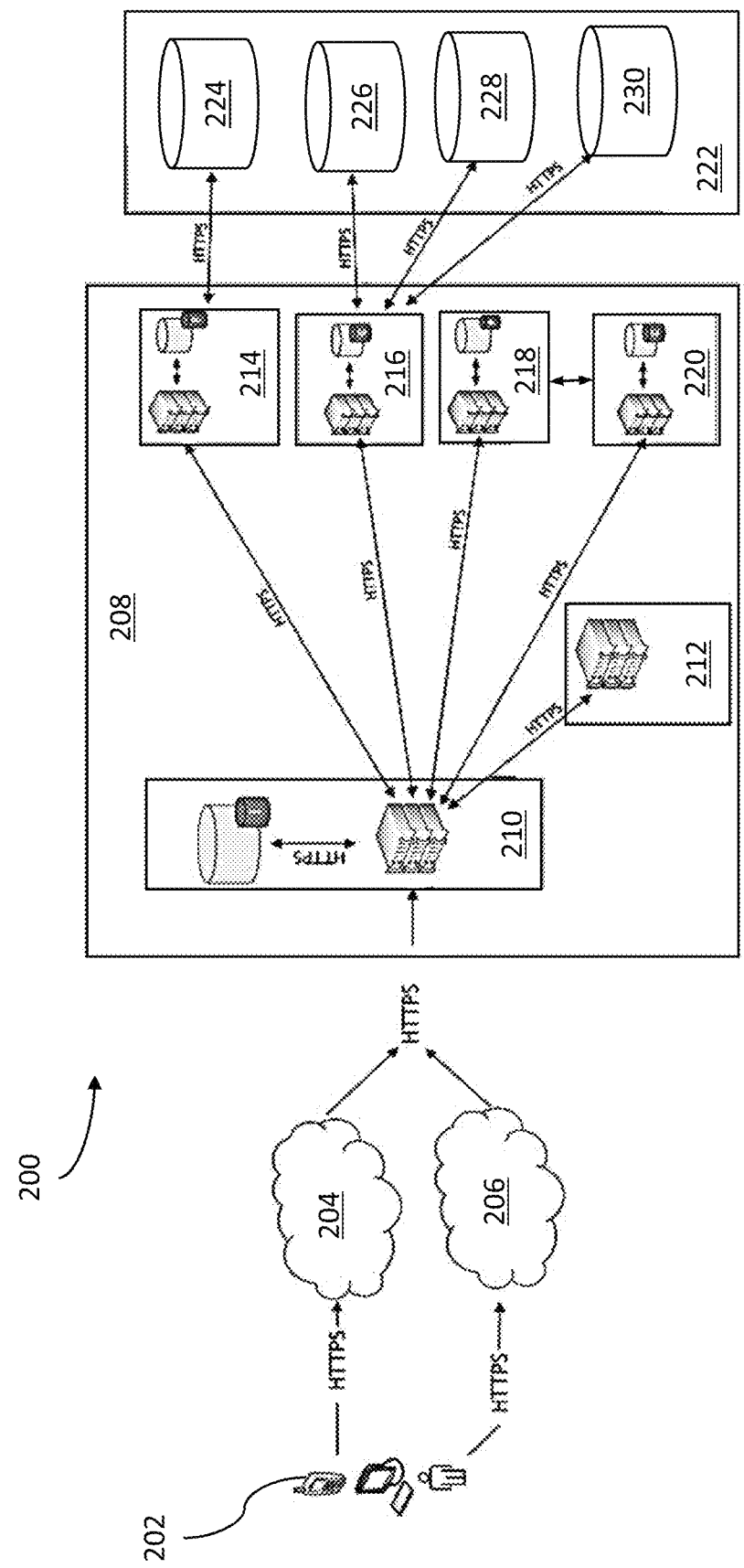
FIG. 2 is a schematic illustrating an example system for routing traffic between APIs of various microservice apps, in embodiments.

FIG. 2 is a schematic illustrating an example system 200 for routing traffic between APIs of various microservice apps, in embodiments. The system 200 shows a cloud native microservice app architecture that runs in a cloud platform, such as the Google™ Cloud Platform. The system 200 may function similarly to the system 100 described above with respect to FIG. 1, but more example components of a cloud server platform are represented and described with respect to the system 200 in FIG. 2.

The system 200 includes client electronic devices 202 that send respective URI requests for a webpage of a website. Those requests (and all other communications shown in FIG. 2) may be secured and/or encrypted, as indicated by the HTTPS communications illustrated in FIG. 2 from the client electronic devices 202. As shown, different requests may be routed to different API gateways 204 and 206. The API gateways 204, 206 may handle different types of requests (e.g., web based versus mobile app based), may be different instances of the same type of API manager, or any other configuration. For example, the API gateway 204 may be an Akamai™ API gateway and the API gateway 206 may be an Apigee™ API gateway. Those gateways may be configured to handle different types of URI requests.

The URI requests may then be routed by the API gateways 204, 206 to an example customizable router 210. As described herein, the customizable router 210 may be, in various embodiments, multiple customizable routers, including multiple different types of customizable routers and/or multiple instances of the same type of customizable router. The example customizable router 210 includes a server and a datastore. Rules for routing traffic are stored in the datastore of the customizable router 210, so that the servers of the customizable router 210 may determine how to route various microservice requests in response to URI requests from the client electronic devices 202 according to the rules, such as further described with respect to FIG. 3. The customizable routers as described herein include a local cache for storing rules that is periodically updated with rules from the datastore. In this way, multiple instances of a customizable router each have a local cache that is updated with new rules periodically from the same datastore. This advantageously allows an administrator to change or add new rules in the datastore, and the local caches of each router instance will quickly update so that each router instance applies the new or changed rule. Further details of an example customizable router are described herein with respect to FIGS. 4 and 5.

After applying rules, microservice requests are routed from the customizable router 210 to microservice apps 212, 214, 216, 218, and/or 220. The microservice apps 214, 216, 218, and 220 each have their own datastores which may be used to store information related to the microservice apps themselves. The microservice apps may be able to send requests to one another as well, as shown by the microservice apps 218 and 220. The microservice apps may also consult a group of datastores 222 to fulfill microservice requests routed through the customizable router 210. For example, microservice app 214 uses datastore 224 and microservice 216 uses datastores 226, 228, and 230 in FIG. 2.

The datastores 222 are separate from the microservice apps 212, 214, 216, 218, and 220 so that multiple microservice apps may use each of the datastores 222. For example, an inventory datastore may include information about products that are available for purchase. Information about available products may be requested by a search microservice app that allows a client to search for products using an e-commerce website. In such an example, the search microservice app may request information from the inventory datastore to populate search results for the client. The inventory database may also be used by other microservice apps, such as a purchase microservice app. For example, if a client uses the e-commerce website to purchase a product, a microservice request may be sent from the purchase microservice app to the inventory datastore to update that product's availability information (e.g., update the inventory datastore to indicate that there is one less of the product available for purchase). If that was the last product available, the inventory datastore then may be updated such that other clients may not have that product populated on search results. In this way, the microservice apps may efficiently use common datastores. Some microservice apps, such as the microservice app 212, may not have its own datastore and may not access other common datastores.

Advantageously, the routing of the microservice requests may occur within the cloud platform 208 of the website. As a result, the routing is highly controllable, for example by easily and quickly updating rules in the datastore of the customizable router 210. Additionally, new microservice apps and/or versions of microservice apps (including experience apps) may be easily and quickly added to the cloud platform 208, for which rules in the datastore of the customizable router 210 may be quickly and easily updated and applied. Accordingly, advantages as described herein are realized, such as being able to easily test new versions/revisions of microservice apps, identify issues and re-route microservice traffic quickly, etc. Additionally, because microservice requests are routed through the customizable router 210 and responses to those requests are also routed through the customizable router 210, information can be collected at the customizable router 210 for each microservice app, such as request response time, error rates, etc.

Figure 3:
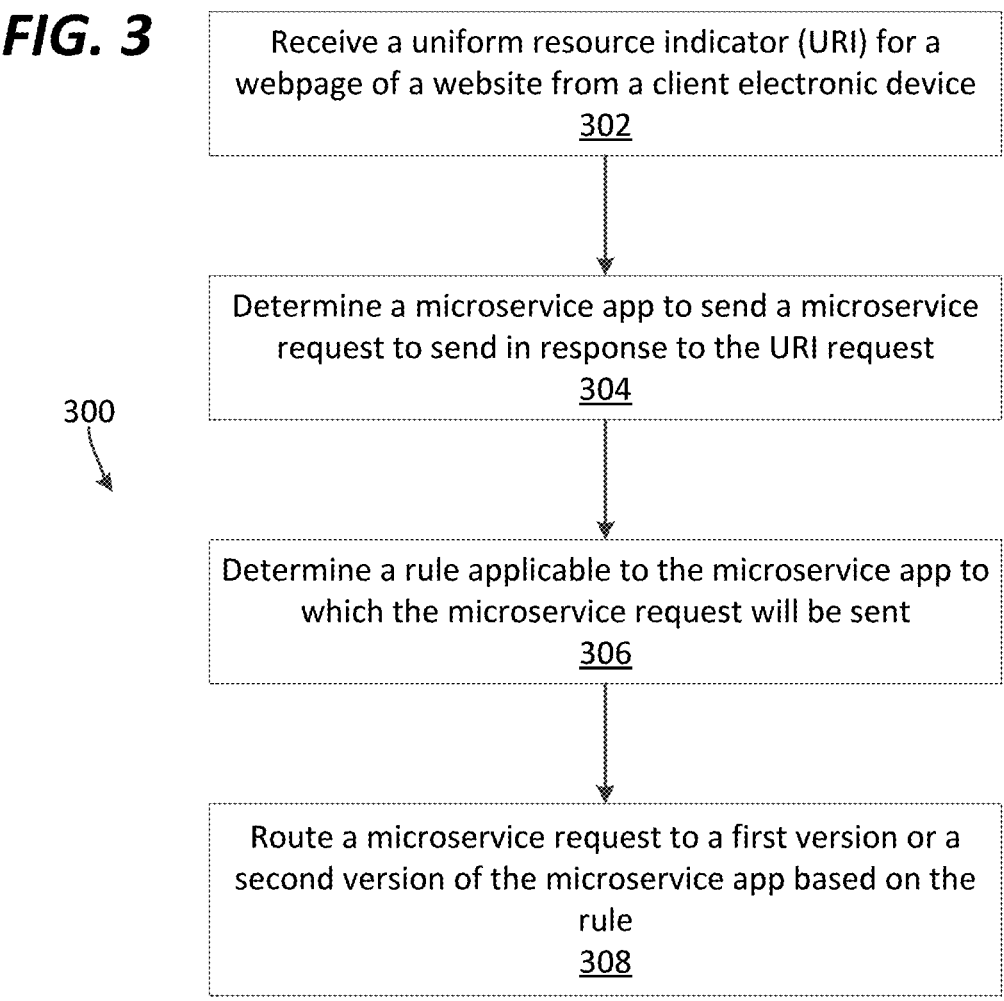
FIG. 3 is a flow chart illustrating an example method of applying a rule to route traffic between APIs of various microservice apps, in embodiments.

FIG. 3 is a flow chart illustrating an example method 300 of applying a rule to route traffic between APIs of various microservice apps, in embodiments. The method 300 may be performed, for example, by a customizable router as described herein (e.g., customizable router 110 and/or 112 of FIG. 1, customizable router 210 of FIG. 2, customizable router 404 of FIG. 4), to apply rules for routing microservice request traffic as described herein.

At block 302, a cloud server system supporting a website receives a uniform resource indicator (URI) for a webpage of a website from a client electronic device. The cloud server system may be, for example, the cloud platform 208 of FIG. 2, such that it includes a customizable router (or multiple instances of a customizable router). The website may include a plurality of microservice applications (apps), such as, for example, the microservice apps 118-121 of FIG. 1 and/or the microservice apps 212, 214, 216, 218, and/or 220 of FIG. 2.

At block 304, a customizable router of the cloud server system determines a microservice app to send a microservice request to in response to the URI request. For example, if a user selects a URI to add an item to a cart on an e-commerce website, a front-end app of the e-commerce website generates one or more microservice requests to be sent to various microservice apps that are relevant to adding the item to the cart. Such microservice apps may include, for example, an inventory app, a price calculation app, a tax calculation app, a shipping app, etc. The front-end app that generates the microservice requests in response to the selection of the add item to cart URI may be stored in various locations, such as in a browser or mobile phone app that the user is accessing the e-commerce website through, or may stored elsewhere (e.g., on a server) and accessed when the user selects the URI. At block 304, the customizable router receives the microservice requests generated at the front-end app and determines how to route those microservice requests as described herein. That determination may be made based on any or all of the URI itself, headers or other information associated with the URI itself, cookies or other sticky routing information, type of microservice request, or any other information as described herein. In various embodiments, the customizable router may determine that multiple microservice requests should be sent to multiple microservice apps in response to a URI request, but only one microservice request is discussed with respect to FIG. 3 for simplicity.

At block 306, the customizable router determines (e.g., in response to the URI request) a rule applicable to the microservice app to which the microservice request will be sent. The rule may be any type of rule as discussed herein. In various embodiments, blocks 304 and 306 may be performed in combination, for example where the microservice app to which a microservice request is sent depends on a rule (e.g., where the customizable router sends requests to different experience apps based on a characteristic). In various embodiments, blocks 304 and 306 may represent separate steps, where a version of the same microservice app is determined based on a rule to which a microservice request should be routed (e.g., where the customizable router routes microservice requests to different versions based on a weighted rule). In such embodiments, the first microservice app has at least a first version and a second version.

At block 308, the microservice request associated with the URI request is routed by the customizable router to the microservice app based on the rule. For example, the customizable router may route the microservice request to one of the first version or the second version of a microservice app based on the rule. In another example, the customizable router may route the microservice request to one of a first microservice app or a second microservice app based on the rule. In other words, the customizable router applies at least one rule to route a microservice request in response to a URI request from a client electronic device.

After the router routes the microservice request to the determined microservice app, the customizable router receives, from the microservice app, information responsive to the microservice request. Such information may be information that the customizable router requested, or may be information that confirms a change to a datastore was made, for example. The customizable router then sends, to the client electronic device for display on an electronic graphical user interface, information responsive to the microservice request. For example, the information requested may be displayed on the electronic graphical user interface of the client electronic device, or the confirmation that that a change to a datastore was made may be displayed on the electronic graphical user interface of the client electronic device.

Although FIG. 3 outlines a single microservice request, embodiments where multiple microservice requests are processed by the customizable router are contemplated herein. For example, the customizable router may receive a plurality of URI requests from a plurality of client electronic devices. The customizable router may determine that a plurality of microservice requests should be sent to a first microservice app of a plurality of microservice apps in response to at least some of the plurality of URI requests. The customizable router may then route a first subset of the plurality of microservice requests associated with a first subset of the plurality of URI requests to a first version of the first microservice app based on the rule, and may route a second subset of the plurality of microservice requests associated with a second subset of the plurality of URI requests to a second version of the first microservice app based on the rule. In such embodiments, the rule indicates weights or percentages for how to route microservice request traffic. In other words, the rule may specify that a first predetermined number or percentage of the plurality of microservice requests should be routed to the first version of the first microservice app, and a second predetermined number or percentage of the plurality of microservice requests should be routed to the second version of the first microservice app.

Figure 4:
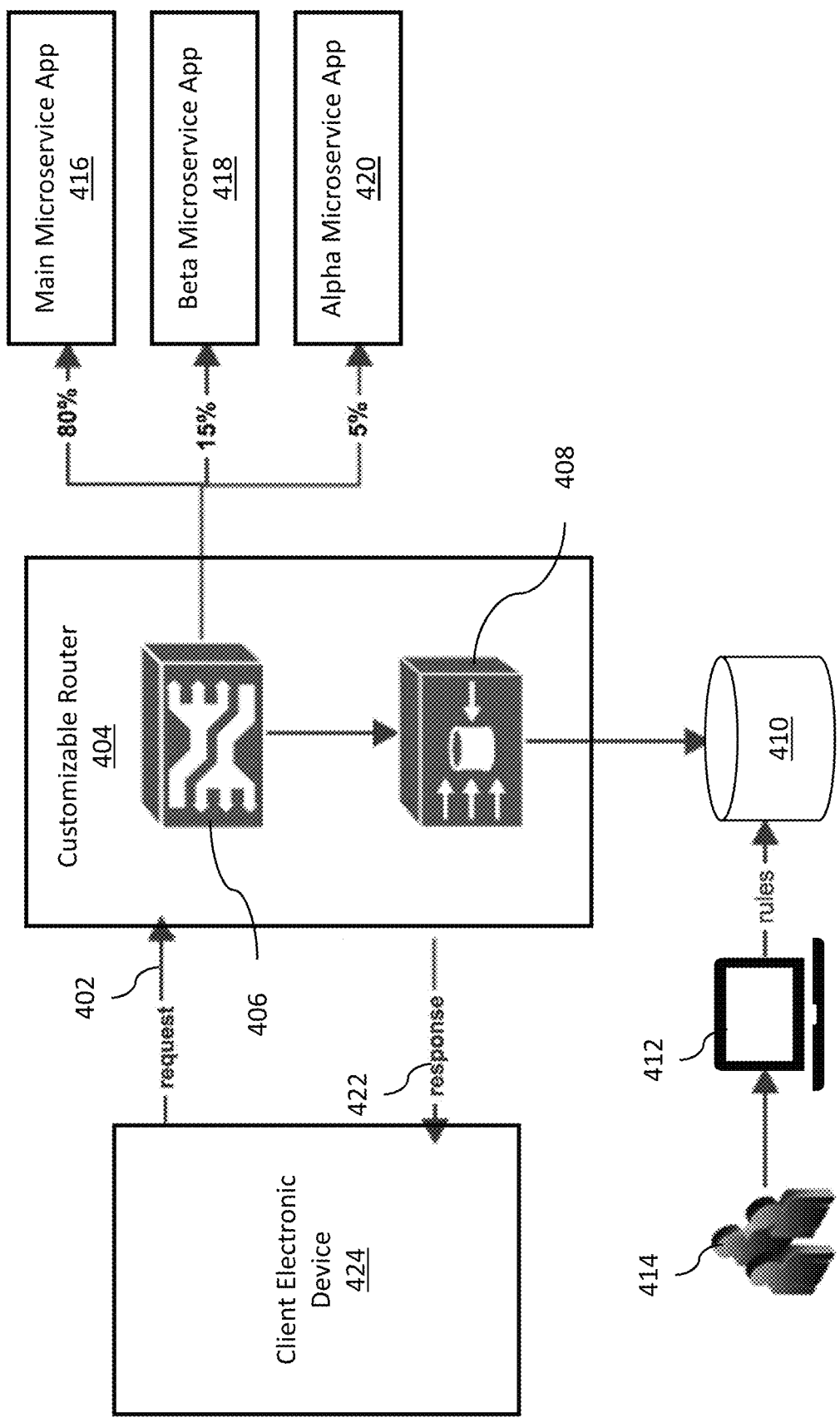
FIG. 4 is a schematic illustrating an example system including an example customizable router for routing traffic between APIs of various microservice apps, in embodiments.

FIG. 4 is a schematic illustrating an example customizable router 404 for routing traffic between APIs of various microservice apps, in embodiments. The customizable router 404 may be used as the customizable routers 110 and/or 112 of FIG. 1 and/or the customizable router 210 of FIG. 2, for example.

The customizable router 404 includes a router engine 406 and a local cache 408. The local cache 408 communicates with a datastore 410 in which rules for routing microservice requests are stored. The rules may be updated, changed, implemented, added, deleted, etc. by an administrator 414 using an administrator electronic device 412. In this way, multiple instances of the customizable router, each having its own local cache, may be continuously updated with any new and/or changed rules made by the administrator to the datastore which stores all the rules. The administrator electronic device may also display various graphical user interfaces, such as those shown and described with respect to FIGS. 7-9, which may be used to observe metrics relating to the customizable router and/or microservice apps of a system, as well as implement changes to rules for routing traffic of a system.

The customizable router 404, similar to the other customizable routers described herein, receives a request 402 (e.g., a URI request) from a client electronic device 424, determines microservice requests to make based on those requests, and applies rules to route those microservice requests. In the example of FIG. 4, a weighted routing rule is used. The weighted routing rule in this example specifies that eighty (80) percent of the traffic for a particular microservice app is routed to a main microservice app 416, fifteen (15) percent of the traffic for that microservice app is routed to a beta microservice app 418, and five (5) percent of the traffic for that microservice app is routed to an alpha microservice app 420. By routing different percentages of the traffic to different versions of the microservice app, the beta 418 and alpha 420 apps may be tested without impacting the service to the majority of traffic using the main microservice app 416. In addition, any problems the beta 418 and/or alpha 420 apps are having may be quickly determined without impacting all traffic. Furthermore, if an issue or problem is identified, the administrator 414 may quickly observe the issue and re-route traffic that was going to a problematic app to other apps or app versions by modifying routing rules. In various embodiments, the system may also recognize issues with a version of an app, and automatically change or adjust a rule for routing traffic to avoid a problematic app. If the system does make such a change, a notification may be sent to the administrator electronic device indicating that the change occurred and/or may include details about the change. The system may also implement such changes for a predetermined amount of time before reverting back to the original rules/weights, or a change to a rule made in response to an issue may be indefinite until an administrator manually adjusts the rule again. Although not shown in FIG. 4, responses to the microservice request are sent back to the customizable router 404, and a response 422 to an original URI request 402 is sent back to the client electronic device 424 that includes information responsive to the microservice request from the microservice app to which the request was routed.

Various methods for implementing weighted routing may be used. For example, a weighted round robin algorithm may be used. A NavigableMap may be prepared in a ROUTE object with the appropriate weights and URI's of revisions during a customizable router server startup. A ROUTE object includes information about a route to a microservice app and its possible ultimate child routes. For example, in FIG. 4, a ROUTE object for the microservice app includes three possible child routes (e.g., main microservice app 416, beta microservice app 418, and alpha microservice app 420). These three child routes are part of the same ROUTE object because they each are the same type of microservice app that handle the same type of microservice requests. The NavigableMap generated includes rules for how to direct traffic to the different possible paths associated with a ROUTE object. These rules of a NavigableMap may be applied by a router and may be stored locally at the router in a cache, and the cache polls a datastore where rules are stored so that the rules may be refreshed periodically (e.g., every one (1) minute).

In the example of FIG. 4, there are three revisions configured under a microservice app with the following weight/percentage of traffic split: route for revision one (1) ("r1")=80%, route for revision two (2) ("r2")=15%, and route for revision three (3) ("r3")=5%. In an example embodiment, each revision route may be associated with a number between one (1) and one hundred (100). For example, r1 is associated with eighty (80), r2 is associated with ninety-five (95), and r3 is associated with one hundred (100). These may be used as rules of a NavigableMap to route microservice requests, for example, or may be used in a simple array to implement the desired routing percentages to each app.

For example, in a NavigableMap, key values of eighty (80), ninety-five (95), and one hundred (100) are set. Each time a microservice request is determined to be routed to a microservice app type, a random number between or including one (1) to one hundred (100) is then generated, and the NavigableMap determines, for example, which key value the random number is closest to and not greater than (e.g., fifty (50) would be closest to and not greater than key value eight (80), eighty-five (85) would be closest to and not greater than ninety-five (95), ninety-five (95) would be closest to and not greater than ninety-five (95), ninety-nine (99) would be closest to and not greater than one hundred (100)). Depending on which key value the random number associated with a microservice request is closest to, the microservice will be routed to r1, r2, or r3.

In a simple array, a similar result is achieved, but logic rules are associated with each possible random number generated. For example, if the random number is equal to or between one and eighty (1-80), rules that associate each of the numbers from one to eighty (1-80) cause the microservice request to be sent to r1; if the random number is equal to or between eighty-one and ninety-five (81-95), rules that associate each of the numbers from eighty-one to ninety-five (81-95) cause the microservice request to be sent to r2; and if the random number is equal to or between ninety-six and one hundred (96-100), rules that associate each of the numbers from ninety-six to one hundred (96-100) cause the request to be sent to r3. In various embodiments, the system may also track a percentage of traffic actually directed to each version/revision, and if the weights deviate from the rule weights too much, the customizable router may send microservice requests to a specific version/revision to balance the actual weights to be closer in line with the desired weights.

Accordingly, FIG. 4 demonstrates how a customizable router may be used to route percentages of traffic to different versions/revisions of a microservice. As described herein, a customizable router may also be configured to stick to that revision for a particular user for a predetermined period of time so that a particular user may stay using that particular app or version/revision (e.g., to keep a user in a consistent, targeted shopping experience).

Multi-level stickiness may also be achieved in instances where microservice apps send requests to other microservice apps (e.g., when an experience app makes a request from another microservice app that is common to (or used by) multiple different experience apps). Microservice apps that are common to (or used by) multiple experience microservice apps may be referred to herein as domain apps, as those apps apply to an entire domain, regardless of the experience of a user. For example, two different experience apps may show details of the same product in two different ways. Accordingly, the experience apps may send microservice requests to at least one domain app to retrieve the information about the product itself. Accordingly, the customizable routers described herein (and all their instances) may be configured so that multi-level stickiness may be achieved. An example of multi-level stickiness is described below with respect to FIG. 6.

Various benefits exist for weighted routing as described herein. An administrator such as a product and development team may release features of microservice apps and independently test those new versions/revisions with varying percentages allocated (e.g., one (1) to one hundred (100) percent) of real client traffic. Therefore, a weighted rule allows an administrator to direct a desired amount of traffic to a new app or version of an app, and the stickiness makes sure those users have a consistent experience. The transparency of the system allows an administrator to see how the new app or version of the app is performing, providing valuable feedback to an administrator. As a result, weighted routing as described herein presents an improvement over known systems for implementing beta versions. For example, a BETA implementation at an Akamai API gateway is generally an all-or-nothing implementation that does not provide traffic throttle granularity for each and every microservice and for each and every microservice version/revision. In other words, a BETA implementation at an Akamai API gateway generally only allows all traffic to for a microservice to be routed to a single version/revision of that microservice. Weighted routing further may further be used to associate multiple resources with a request pattern/service and choose how much traffic is routed to each version. This may be useful for a variety of purposes, including load balancing, testing new versions of a developed software, etc.

Figure 5:
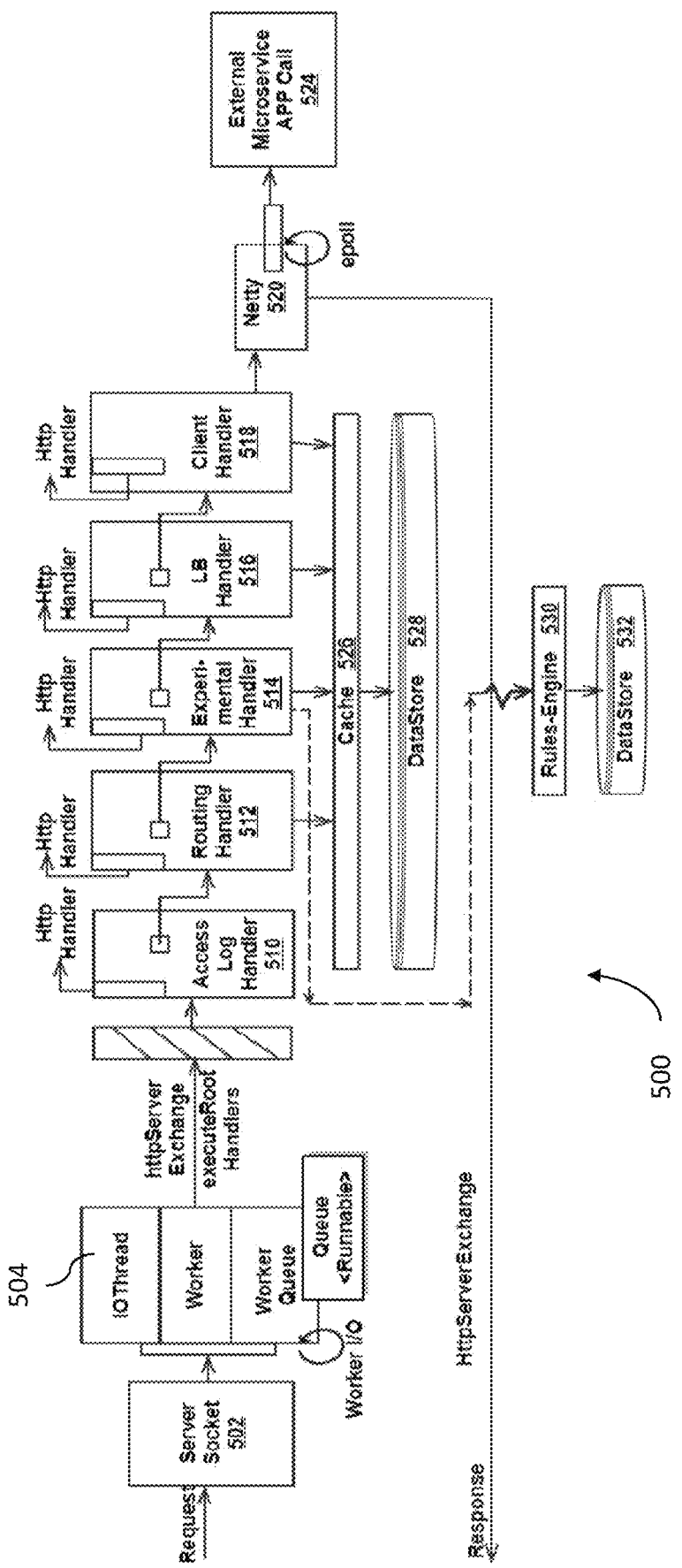
FIG. 5 is a block diagram view of an example customizable router engine, in embodiments.

FIG. 5 is a block diagram view of an example customizable router engine 500, in embodiments. The customizable router engine 500 may be or may find use in, for example, the router engine 406 of FIG. 4. The customizable router engine 500 may include custom http handlers. The http handlers may be, for example, extended from an Undertow native handler framework. Undertow is a lightweight web server used to handle non-blocking or asynchronous tasks. This native handler framework provides flexible plugin architecture that allows middleware handlers such as those shown in FIG. 5 to be injected into the request/response chain to execute various functions as desired by an administrator. Such a plugin architecture allows middleware handlers (e.g., handlers 510, 512, 514, 516, 518) to be used in a plug and play type manner to perform different tasks in a request/response chain to handle tasks such as balanced routing, security, metrics, auditing, etc. The combination of these various handlers 510, 512, 514, 516, 518 provides the advantageous functions for customizable routing of traffic between microservice apps as described herein throughout.

When a request (e.g., a microservice request) comes into the customizable router engine 500, the request is processed by the handlers 510, 512, 514, 516, 518 before being sent out to various microservice apps. Those various microservice apps may be external to the customizable router engine 500 and the customizable router (e.g., the customizable router 404 of FIG. 4) in which the customizable router engine 500 operates. Accordingly, these http handlers 510, 512, 514, 516, 518, along with a Netty httpClient 520 (with epoll) along with an external microservice app call 524 to make the external service calls (e.g., microservice requests) makes an AIO (asynchronous input/output) (e.g., non-blocking) system that can customizably route external service calls (e.g., microservice requests) as described herein.

When the application for the customizable router engine 500 starts-up, the app reads all the rules of routes stored in a datastore 528 and prepares a cache 526. The cache 526 and the datastore 528 are in communication with a routing handler 512, an experimental handler 514, a load balancing (LB) handler 516, and a client handler 518. The system may use, for example, a read-through Guava cache library for the cache. The rules in the cache may be refreshed periodically (e.g., every one (1) minute) to accommodate any changes made to the rules stored in the datastore. Changes to the rules may be made, for example, by an administrator via the user interface 800 illustrated in FIG. 8 and further described below. The datastore 528 and the cache 526 may also store other information used the handlers 512, 514, 516, 518 in processing requests such as microservice requests.

An incoming request (e.g., microservice request) arrives at a server socket 502 (e.g., a socket of an Undertow web server) and is processed through the elements 504, which include an input/output (I/O) thread, a worker, and a worker queue running a queue and a worker I/O. Once processed at the elements 504, a request is handled by the various handlers 510, 512, 514, 516, 518 are executed to process the requests.

At an access log handler 510, information may be recorded such as an internet protocol (IP) address from which the original request originated. Other information such as the URI request itself, an http status code (e.g., 200, 404, 500), response time (e.g., time taken by server to respond/serve a request from a client electronic device), response byte size sent back to a client electronic device in response to a request, etc. The access log handler 510 may be customized as to record different, additional, or fewer pieces of information in various embodiments. The access log handler 510 may also stream any data it records to a stack driver logging API which consolidates and displays the information. For example, the information may be displayed to an administrator in a user interface, such as the user interface 900 illustrated in and further described below with respect to FIG. 9. In this way, the information collected/recorded by the access log handler 510 may be used to adjust rules for routing microservice requests, either manually by an administrator or automatically by the system.

Requests from the access log handler 510 are handled to a routing handler 512 next. Although the specific handlers 510, 512, 514, 516, and 518 are shown in FIG. 5, various embodiments may include additional or fewer handlers than shown, and may order handlers in different orders such that requests are processed in varying orders. In various embodiments, some handlers may also handle requests simultaneously rather than sequentially.

The routing handler 512 is a customizable handler that maps and determines and incoming URI request based on pattern and patch matching templates. Configured request paths may be stored in the cache 526 are then are matched with the URI request form a client electronic device by a custom algorithm at the routing handler 512. The path patterns matched by the algorithm may ultimately be stored in the datastore 528, and held in the cache 526 for easy and quick application by the routing handler 512. The algorithm may be, for example, a Trie datastructure called longest stem match first, which is executed by the routing handler 512. The Trie, also referred to as a digital tree, radix tree, or prefix tree, is a type of search tree (e.g., an ordered tree data structure used to store a dynamic set or associative array where the keys are often strings). In various embodiments, other types of datastructures could be used.

Requests may also be handled to an experimental handler 514. In some embodiments, a customizable router engine 500 may not have the experimental handler 514, and requests may be handled from the routing handler 512 to the LB handler 516. The experimental handler 514 is a customizable handler that determines the eligibility of a URI request for a route that exposes a user to experimental features of a website. The experimental handler 514 calls a rules engine 530 to determine eligibility for an experimental feature and/or content to deliver to a user. An administrator may update rules stored in a datastore 532 so that rules applied by the rules engine 530 and the experimental handler 514 may be varied as desired. For example, the experimental handler may retrieve decorated content for a webpage for an eligible URI request either for a new routing or an existing routing of a URI request. Example experimental routing systems and methods as well as a rules engine are illustrated in and discussed further with respect to FIGS. 11-16.

The routing handler 512 and/or the experimental handler 514 passes a request to the LB handler 516 where any request header/cookie related predicates are resolved and executes custom routing rules, such as a random weighted routing algorithm. This function of the LB handler 516 is important for stickiness, looking up header/cookie (or identifying some other characteristic which is used to route a request), storing new header/cookie information, etc. In other words, the LB handler 516 helps identify any header/cookie information that may be used according to a rule to route a microservice request, may store any new header/cookie information that may be used to route a microservice request according to a rule in the future, etc. Storing new header/cookie information may also include storing information about how a request related to a new header/cookie is routed the first time, so that it can be routed in the same way in the future (e.g., achieve the stickiness). If there is no information instructing the LB handler 516 how to route a request, some other rule may be applied, such as a weighted routing rule. In other words, when the LB handler 516 receives a request, it determines the best route based on rules in the cache to use a random weighted routing algorithm or a sticky weighted routing if a revision has already been associated with a request or client electronic device previously. The sticky weighted routing may use, for example, a route configured based on a request parameter to stick to a particular revision (e.g., child path) or a route configured based on a request header/cookie that causes the request to stick to a particular revision (e.g., child path). Based on the selected routing, the LB handler 516 chooses the proper destination URI and passes on the request to be handled by the client handler 518.

At the client handler 518, the actual external service call (e.g., microservice request) is made with a customizable asynchronous httpClient using Netty 520. An asynchronous httpClient executes HTTP requests and asynchronously processes HTTP responses. The calls to external microservices are asynchronous because the calls do not block a thread that originally accepted the request. Therefore, the I/O thread that accepted the original URI request from the client electronic device will move on to take another request/task, while the worker thread of the elements 504 will perform the task on behalf of the original URI request and sends the response. Accordingly, external service calls (e.g., microservice requests) to the correct microservice app (or microservice app version) are efficiently sent out as an external service call 524. The calls are considered external because they are external to the customizable router engine 500 and are sent to the microservice apps as determined by the customizable router engine 500.

An httpResponse is read in a NativeByteBuffer leveraging partial zero copy transfer and sent to the client by the Netty httpClient 520. The rules in the datastore 528, may also leverage a hierarchical data model so that microservice apps may be grouped with a common set of properties. For example, a parent route may have multiple children sharing similar (parent level properties) or may have overridden properties at the individual child level. By having rules that apply to a group of microservice apps, the rules may be more quickly and efficiently applied by the customizable router engine 500. The Netty httpClient 520 is used to achieve better throughput and lower latency. The epoll is a Linux native transport used with Netty for handling network connections efficiently. The response time and the http response code from the upstream services and related metrics may be asynchronously posted to a Google™ stack driver monitoring API for further observability. For example, metrics posted to the Google™ stack driver may be displayed in a user interface 900 as illustrated in and described with respect to FIG. 9. The Google™ stack driver may use a library called open census. Open census is a collection of libraries that collects telemetry-like metrics and distributed traces from services and export it to any exporter, such as Google™ stack driver, Prometheus, Amazon™ Web Services (AWS) X-Ray, Azure™ Monitor, etc.

In various embodiments, the customizable router engine described herein may also implement rules for dynamic routing of traffic to various microservice apps and different versions of those apps based on one or more characteristics of a user, the client electronic device, a URI request, or other characteristics. For example, a characteristic may be related to a specific URI request or aspects related to or associated with a specific URI request (e.g., a header, cookie, IP address, etc.). The customizable router engine may apply a rule related to a characteristic, such that characteristic is used by the customizable router to determine how to route microservice traffic, in contrast to randomly assigning a user or client electronic device to use a microservice app version (e.g., using a weighted rule).

For example, a characteristic used to route a microservice request according to a dynamic routing rule may be information about a user (or their client electronic device). The information about the user (or their client electronic device) may be determined by the customizable router and used to route a microservice request related to a URI request from the user to a particular version of a microservices app. For example, cookies stored in a browser, a client electronic device's IP address, a user account, parameters or headers of a request, etc. may all indicate particular information (e.g., a characteristic) about a user or their client electronic device, such as geographic location or region, device or browser type, browsing history, etc. Any of this information may be used by a customizable router to determine how to route microservice app traffic based on a characteristic. For example, the customizable router may route traffic related to a first geographic region to a first version of a microservice app, while the customizable router may route traffic related to a second geographic region to a second version of the microservice app. In other words, rules of a customizable router may be configured by an administrator to dynamically route microservice requests relating to a URI request from a client electronic device to a particular version of a microservices app based on the determined characteristic about a user and/or their client electronic device. In order to perform dynamic routing, a customizable router may determine a characteristic associated with a client electronic device, a user account associated with the client electronic device, or a presumed user associated with the client electronic device. For example, characteristics used by a customizable router to determine how to route a request may include an association with an organization or business of a client electronic device, a user account, or a presumed user; an estimated income associated with a client electronic device, a user account, or the presumed user; an employer associated with the client electronic device, the user account, or the presumed user; or past traffic history associated with the client electronic device, the user account, or the presumed user. A customizable router may then route a microservice request to a microservice app and/or a version of a microservice app based on such a determined characteristic as described herein.

Accordingly, dynamic routing to a specific revision of an app may be based on a characteristic in a request header, a cookie, a source IP address, or other request parameter sent by a browser or mobile app as part of a URI request. Stickiness may also be built into dynamic routing, as a user or client electronic device with a particular characteristic should get routed in a similar manner in response to multiple URI requests because that characteristic will not change between subsequent URI requests. Dynamic routing may advantageously be used by a customizable router to route requests based on geographic regions, zip codes, specific traffic patterns, or any other characteristic that may be determined or deduced from information related to a URI request, such as device types, source IP address ranges (which may indicate an internal organization, business user, or third-party user), or any other information. Dynamic routing rules may also be used to triage a cluster of users for detecting issues, optimizing performance, isolating and diagnosing issues, etc. For example, certain device types may be dynamically routed to a particular app or app version to determine if a particular bug for that device type exists, has been fixed, has an abnormal error rate, etc. Development teams may also test new features directed to certain characteristics of users such as device type without merging that code into main streams that may impact current operational lower lifecycle testing. Such functionality may greatly improve the agility of the development teams, improving the time to test and implement new app versions/revisions.

In various embodiments, the customizable routers described herein may also implement rules for experience/ experimental based routing that use a determined characteristic. For example, a customizable router may route microservice requests to a particular experience app or version of an experience app when a characteristic of a URI request and/or a header associated with a URI request is identified. As described herein, experience apps may request information from at least one other microservice app to populate a requested webpage and provide a particular experience to a user. Any of the characteristics described herein may be used by the customizable router for experience/experimental based routing. For example, a customizable router may route microservice requests based on a determined characteristic of a user, a client electronic device, information presumed about a user, etc. (e.g., geographic location, device type, income, user account, association with a business or employer, etc.). Other routing rules may be applied by a customizable router to route a second microservice request from the experience app to at least one other microservice app.

In various embodiments, rules for experience/experimental based routing may also be based on an item number or category an item related to a URI request belongs to. Therefore, URI requests related to certain items or categories of items may be routed to an experience app as desired. For example, during a particular time of year such as a holiday season, an e-commerce website may route all items in a Christmas decoration category to a specific experience app. During other times of the year, the rule may direct a user for that category of product to a normal experience app. In this way, the rules in the customizable router may be used to direct clients to certain experience apps without having to change the actual URI's that are used and/or requested by clients. In another example, certain requests may be routed to a first experience app if the item/category belongs to a home-decoration related category. As described herein, the first experience app may have a different template and shopping experience compared to a second experience app. So instead of a percentage (weighted routing) or client device (dynamic routing) related rule, an administrator may establish a rule for a product or product category request to be routed to a certain experience app or experience app version. Accordingly, administrators may test out new experience apps in a limited way or route certain product types to certain apps and also not have to change the URI paths (change the default path) every time an administrator wants to adjust what URIs are directed to a particular experience app or experience app version.

A normal URI request may be routed, for example, by matching the longest URI path of a URI request. However, changing a rule for each URI path for every product in a product category to redirect to a particular experience app is time consuming to accomplish. Instead, as described herein, an administrator may establish a rule for a customizable router that includes a set of configurable item categories and/or item identification (ID) numbers that are all routed to the same experience app. An administrator may configure that set of item categories or item ID numbers that should be directed to a particular experience app (e.g., determine which items and/or product categories to redirect to an experience app). The item ID number and/or item category for each URI request that comes into the customizable router is then evaluated dynamically in the customizable router to determine which experience app to route microservice requests to based on the administrator configured set. The system may also use various methods described herein to maintain multi-level stickiness. To do so, the customizable router identifies the item ID or item category from the URI (or other characteristic associated with a URI request), and uses that information to route a microservice request instead of matching a longest path URI. Advantageously, using the systems, methods, computer readable media, and graphical user interfaces described herein, the administrator does not have to redefine a path for each URI of the product category or list of products that should be routed to a particular experience app.

Other aspects of a URI request (or other characteristic including headers, cookies, etc.) may also be used to route a request to a desired experience app/template. For example, a determined characteristic may be used to route a specific set of requests based on geographic regions, zip codes, cookies, device types, user accounts, company associated with a user, source IP address ranges, etc. Such routing may also be useful for detecting issues, optimizing performance, etc. For example, certain traffic may be isolated to a particular microservice app version if it is having issues, or if an administrator wants to see how traffic related to users with a certain characteristic functions on a new app revision/version. In this way, administrators may test out new experience apps in a limited way or route certain device types to certain apps without having to change URI paths (change the default path) every time the administrator wants to adjust traffic or test a new app revision/version.

In various embodiments, the customizable router engine described herein may also have rules for traffic shaping. For example, a first instance and/or version of a microservice app may be associated with one or more servers in a first geographic region, while a second instance and/or version of the microservice app may be associated with one or more servers in a second geographic region. A customizable router may implement a traffic shaping rule based on performance metrics of the one or more servers in the first geographic region compared to the one or more servers in the second geographic region. For example, the rule may specify that more traffic be routed to an instance or version of the microservice app that has better performance metrics. This rule may be configured to be implemented automatically if performance of one region decreases. Alternatively or additionally, an administrator may monitor performance of various regions of a cloud computing system and manually adjust traffic routing based on performance metrics of the cloud computing system.

Accordingly, the customizable routers described herein may route website traffic to a cloud server region when one or more other regions are not available or have stability issues by adjusting which instances of microservice apps requests are routed to. Advantageously, this can improve overall website availability and response times, as well as provide a quick fix for when there are errors and/or availability issues. For example, since all microservice requests and responses are routed through a customizable router as described herein, the customizable routers may be used to detect issues (errors such as no response from a microservice app, slow response times, etc.) and alert an administrator electronic device quickly if, for example, a newly introduced feature/revision has an error rate that exceeds a predefined threshold (e.g., a default threshold or one set by an administrator). This advantageously provides for fast fault detection and notification with appropriate remediation that makes the experience of using a website seamless to the end users. In various embodiments, if an error rate to a particular microservice app instance exceeds a predefined threshold, the customizable router may route traffic away from the problematic microservice app instance to instances that do not have error rates above the predefined threshold. That changed routing may last for a predetermined amount of time, until the routing is manually adjusted by an administrator, and/or may be automatically adjusted once the error rate of the problematic instance returns back to an acceptable level (e.g., below the predefined threshold).

Figure 6:
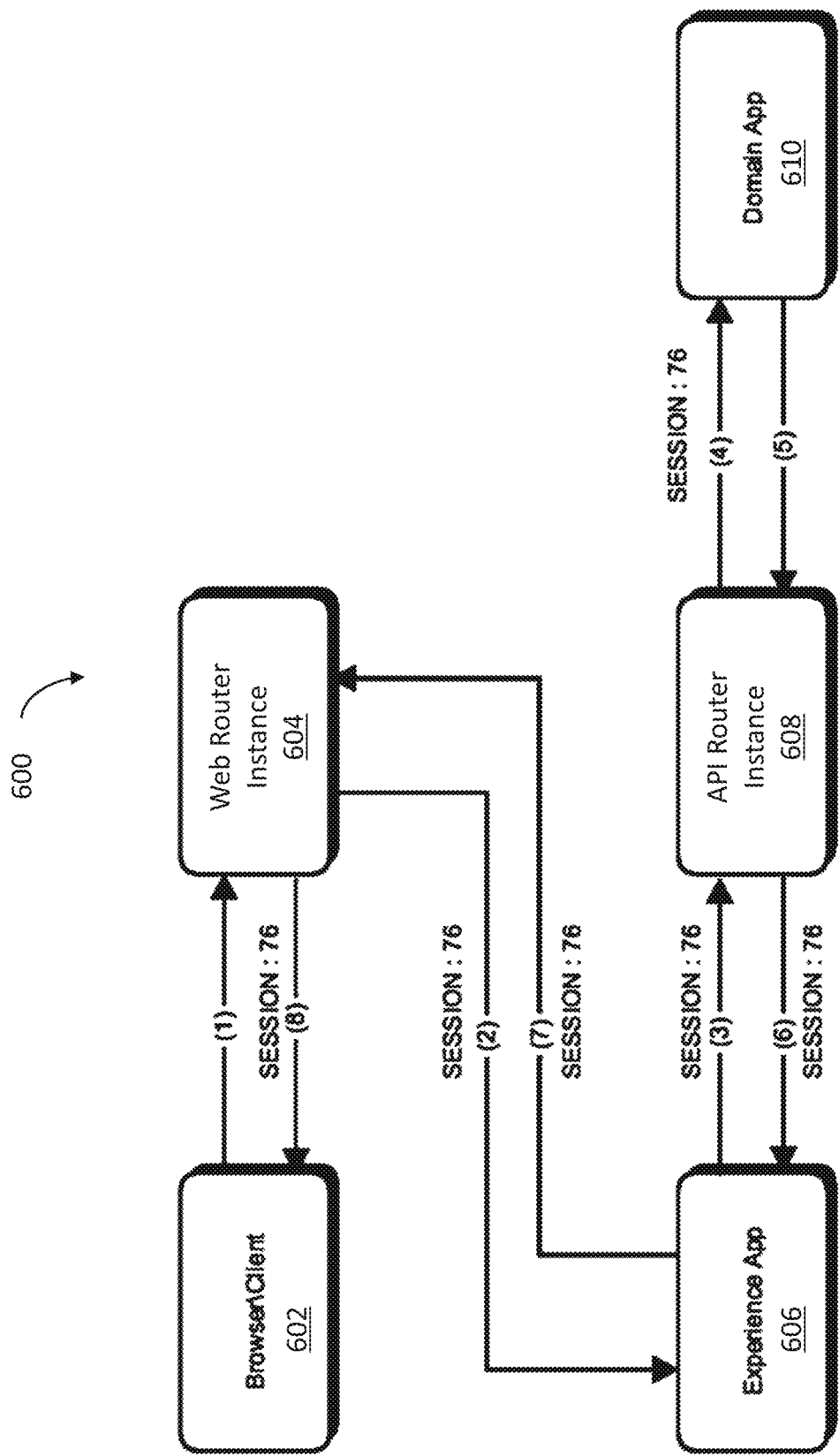
FIG. 6 is a flow chart illustrating an example method of setting an identifier cookie applicable to multiple microservice requests between multiple microservice apps, in embodiments.

FIG. 6 is a flow chart illustrating an example method 600 assigning setting an identifier cookie applicable to multiple microservice requests between multiple microservice apps, in embodiments. In other words, the customizable router may store an identifier as a cookie (or as some other similar characteristic) associated with a URI request, so that stickiness/session affinity may be achieved for a user. One or more instances of the customizable router may use the identifier to route microservice requests relating to a specific webpage of a website or for any webpage of a website, whether that user has requested that particular webpage before or not. In other words, once a client electronic device has an identifier associating it with a particular routing for a website, that customizable router may apply that routing for any URI request relating to that website, even if the client electronic device has not requested a particular URI before. For example, a client electronic device may access an e-commerce website to buy a first item. The customizable router may route requests to a certain version of a shopping cart microservice app while the client electronic device completes the transaction. Based on the identifier, the customizable router may route any URI request to that same version of the shopping cart app in the future, regardless of which part of the website the user is on, what the user is purchasing, etc.

Identifiers such as a cookie may also be used to achieve multi-level stickiness for microservices. For example, as described with respect to FIG. 6, stitching a session identifier to a browser/client/client device may be used to achieve stickiness across multiple levels of microservices, such as between an experience app and a domain app.

The method 600 includes a browser/client 602 sending a URI request (1) to a customizable web router instance 604 (e.g., a customizable router configured to handle web or www URI requests). The web router instance 604 assigns a random number for the session (76) to the browser/client to achieve stickiness between levels. When the web router instance 604 makes a microservice to an experience app 606 at (2), the session identification number is included in a generated cookie for the browser/client. A microservice request (3) from the experience app 606 is routed through an API router instance 608 to a domain app 610 as microservice request (4). The API router instance 608 may use the session (76) number to determine which domain app to rout request (4) to (or if the API router instance 608 has never seen that session number before, it can route according to another rule or randomly). The session number (76) in the cookie is kept with the requests (6), (7), and (8) all the way back to the browser/client 602 so that it can be stored as a cookie in the browser/client 602. In this way, if the browser/client 602 makes another request, the request may include the cookie with the session number (76) and be routed the same way at multiple levels to both the experience app 606 and the domain app 610, providing a consistent experience for a user across multiple levels of microservice apps. In such a subsequent request, no new session number is generated, because one is already associated with the browser/client 602.

Multi-level stickiness is particularly advantageous where different customizable routers at different levels are applying different rules for routing. For example, the web router instance 604 may apply a first experience based routing rule to route the request (2) to the proper experience app 606. The API router instance 608 may apply a weighted rule to route the request (4) to the proper domain app 610. By assigning and using the session identification number, that multiple level path can be stored and associated with the session number, so that when a new request with that number comes in it can be recalled by all instances of the customizable routers to route the requests at each level the same way as before.

In various embodiments, a browser/client may also send different URI requests that do not get routed to the experience app 606, for example. However, those different URI requests may still cause microservice requests at the lower level to be routed to the domain app 610 because the session number (76) was included in the different URI requests. In this way, a multi-level stickiness may persist even if different URI requests are used by a user, even if that specific URI has never been requested before by a user.

Figure 7:
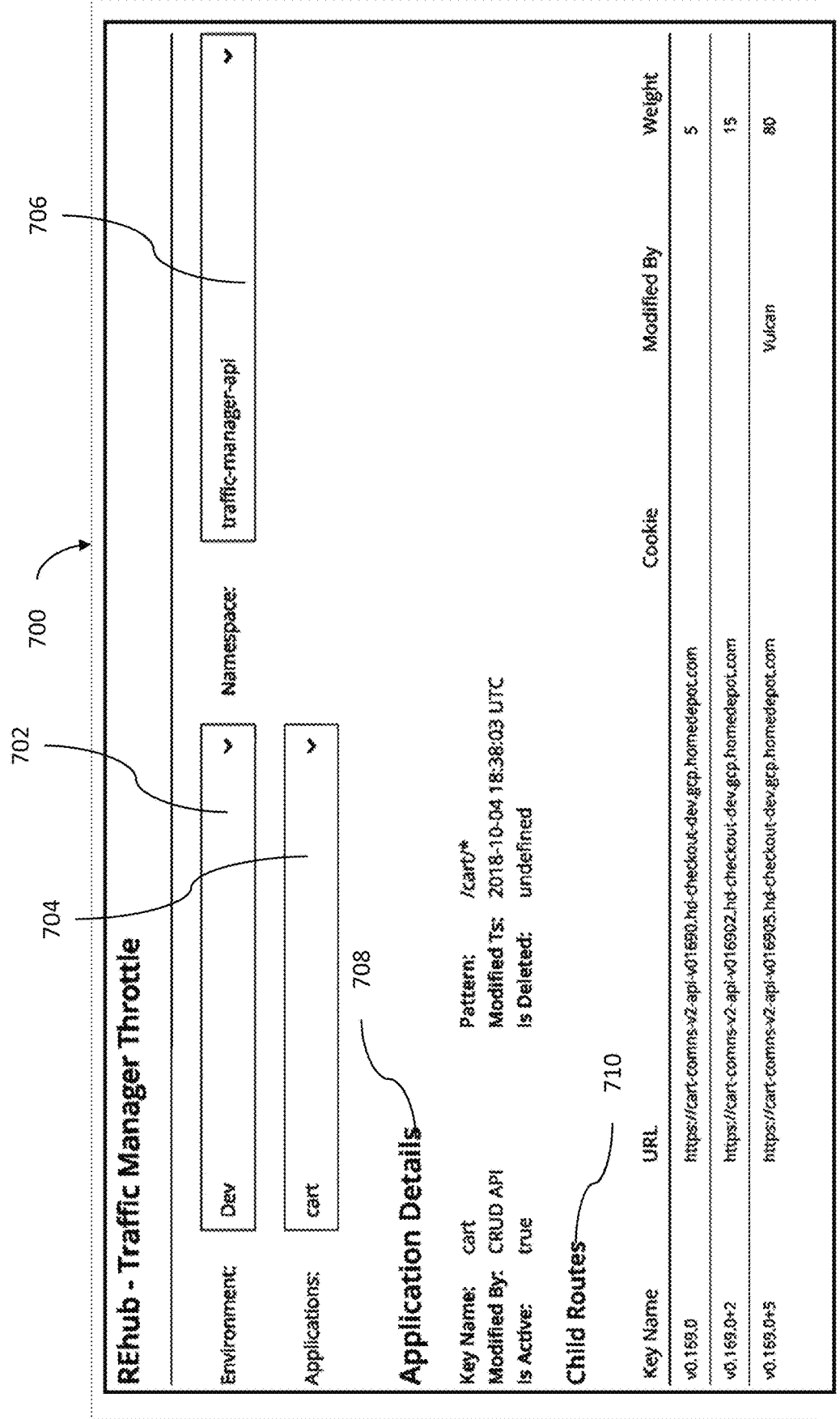
FIG. 7 illustrates an example graphical user interface for setting weighting rules for routing traffic between APIs of various microservice apps, in embodiments.

FIG. 7 illustrates an example graphical user interface 700 for setting weighting rules for routing traffic between APIs of various microservice apps, in embodiments. The graphical user interface 700 allows administrators to onboard new apps, configure the rules for those new apps, adjust old rules, remove old apps, etc.

The graphical user interface 700 includes dropdown menus 702, 704, and 706 for selecting an environment, application, and namespace, respectively. These dropdown menus may be used to ultimately specify a microservice app to view rules for and change/add/delete rules for. The graphical user interface 700 includes an application details 708 area that includes details about the application that is selected at the dropdown menu 704. A child routes area 710 shows rules/routes that have been established for the microservice app. In particular, the app in FIG. 7 is configured for weighted routing, sending five (5) percent of traffic to a version v0.169.0, fifteen (15) percent of traffic to a version v.0169.0+2, and eighty (80) percent of traffic to a version v0.169.0+5. Using the graphical user interface 700, those weights, destinations, etc. may be changed to update a rule, or certain routings may be added or deleted as desired by an administrator. This allows for efficient onboarding of a new app, as a new app target (URL in child routes area 710) may be added in the route table entries, and the weights of any existing apps may be modified to redirect traffic to a new app for a given request path (e.g., a URI request). Instances of a customizable router may also read and repair from their peers to prepare the state and configuration of the rules in their cached memory (e.g., the local cache of a customizable router). Therefore, the customizable routers do not have strict dependency on the datastore that has the configured rules. This may provide for resilient customizable routing systems that have little or no downtime for, especially during a cloud auto scale up/down/healing when a datastore may be down.

Advantageously, microservice application reboot is not required for any configuration changes using the graphical user interface 700, including onboarding a new microservice app or microservice app version/revision. Changes to the rules using graphical user interface 700 may be detected very quickly by the customizable routers of the system, thereby avoiding downtime or latency in getting new apps up and running.

Figure 8:
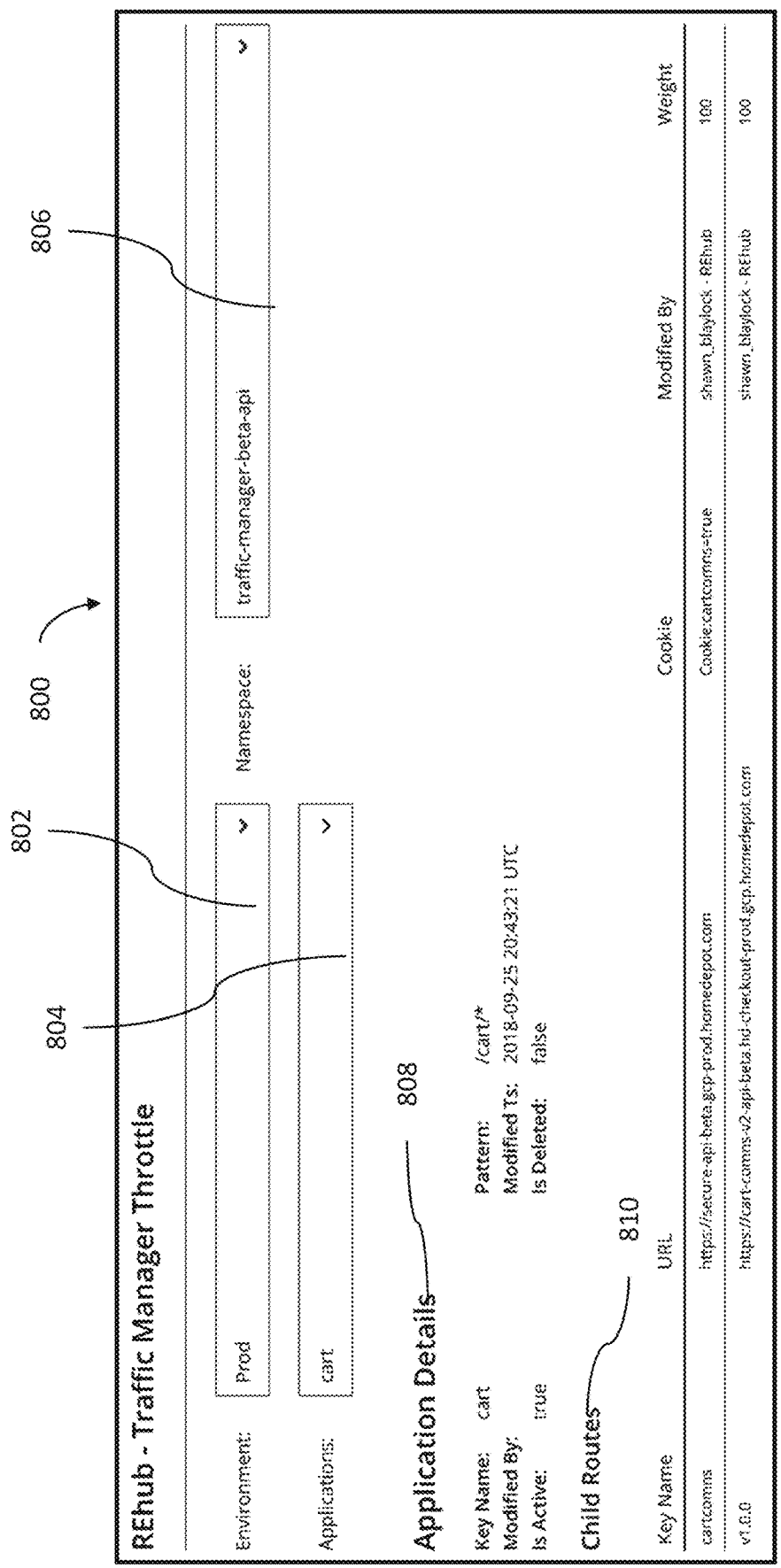
FIG. 8 illustrates an example graphical user interface for setting characteristic rules for routing traffic between APIs of various microservice apps, in embodiments.

FIG. 8 illustrates an example graphical user interface 800 for setting characteristic rules for routing traffic between APIs of various microservice apps, in embodiments. The graphical user interface 800 includes dropdown menus 802, 804, and 806, similar to FIG. 7, which may be used to specify a particular app to view and/or change the rules for. Also similar to FIG. 7, the graphical user interface 800 includes an application details area 808 and a child routes area 810. The child routes area 810 in this example shows rules for a dynamic routing. In particular, any URI request for the cart app with a cookie indicating a "cartcomns" characteristic is directed to a microservice app (with an address of a first URL), while any URI request without a cookie indicating a "cartcomns" characteristic is directed to a second microservice app (with an address of a second URL). In various embodiments, multiple rules may also be applied to a URI request from a client. For example, a URI request for the cart app with a cookie indicating a "cartcomns" characteristic may have a rule to route it to a particular app (e.g., an experience app), and a second rule may determine weights for what version of the particular app to route traffic to. In this way, multiple rules may be applied to a single URI request. In various embodiments, any of the different rule types as described herein may be applied to a single URI request as long as they are not in conflict with one another.

Figure 9:
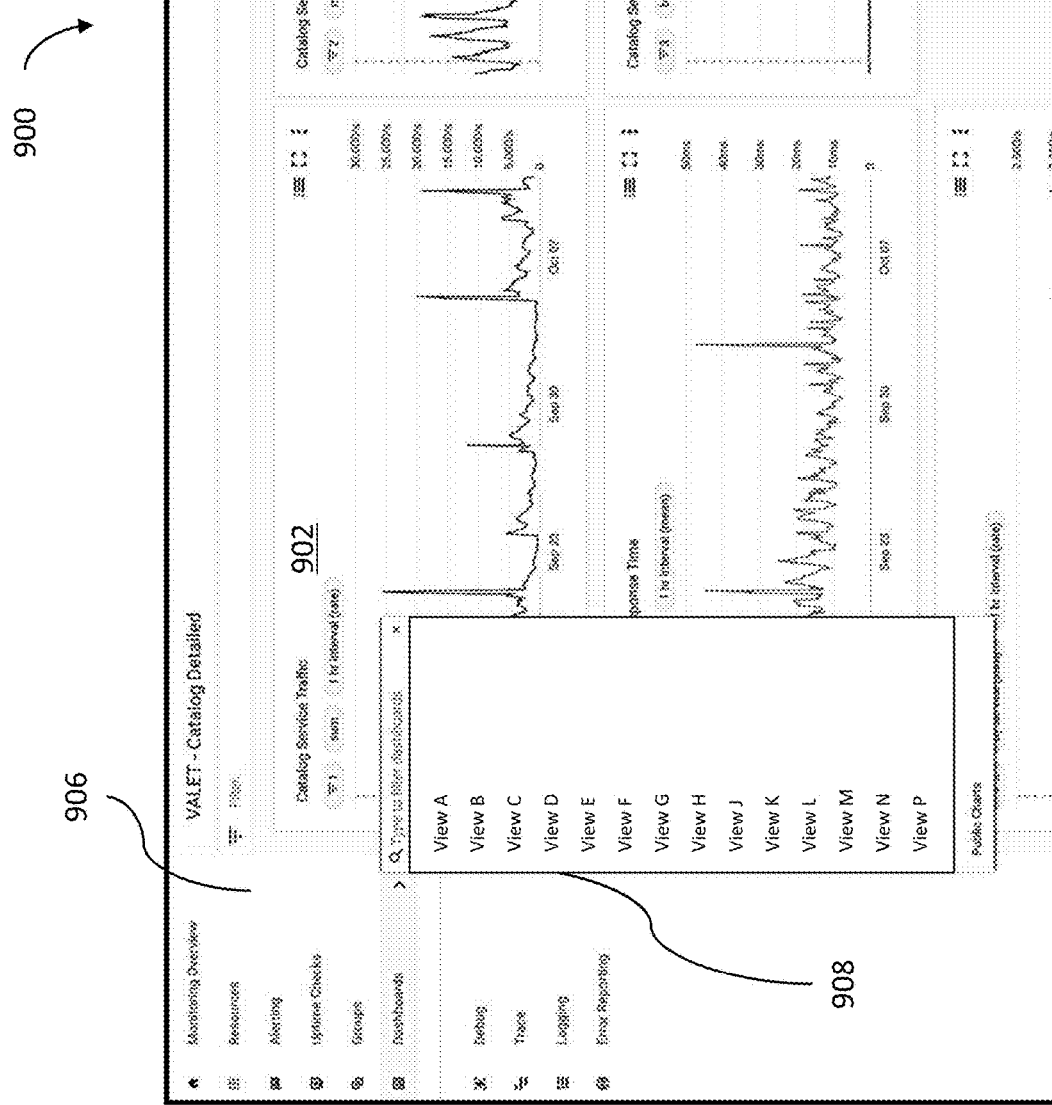
FIG. 9 illustrates an example graphical user interface of performance metrics of a customizable router presented to a user, in embodiments.

FIG. 9 illustrates an example graphical user interface 900 of performance metrics of a customizable router presented to a user, in embodiments. The graphical user interface 900 shows metrics for an example system collected at/by a customizable router as described herein. The graphical user interface 900 includes data graphs 902 and 904, which show different data relating to a system such as total traffic for a microservice app over time (graph 902) and response times for a microservice app over time (graph 904). The graphs may be moved around, or different graphs may be displayed. The dashboard button on a control pane 906 of the graphical user interface 900 may be selected to reveal a dropdown menu of different views (or dashboards) that an administrator may select. The views may be related to different types of performance metrics, particular microservice apps, groups of microservice apps, groups of versions/revisions of a particular microservice app, one or more experience apps, different characteristics determined about users/clients or their devices, or any other criteria.

Because the customizable routers herein can route based on the version/revision of an microservice app, granular data collected down to the app revision/version level may be advantageously collected. Information about performance of microservice apps on the revision/version level may be used to calculate and display robust logging, metrics, and monitoring of the various parts of a website cloud computing system (e.g., as shown and described with respect to FIG. 9) to help gain deep insights into the microservices architecture. This advantageously provides a global view of consumer operational metrics such as throughput, latency, errors, and availability at a global scale. This is extremely useful to administrators, including app developers, especially with the challenges inherent to the distributed nature of operating a large website with numerous microservices and datastores for a large number of hybrid/multi-cloud projects. Accordingly, administrators may also advantageously gain better understanding of how microservice app performance impacts other upstream and downstream microservices, the end clients, etc.

As just one example, a client library and metrics aggregator system may be used to collect and submit metrics data to a monitoring backend, such as Google™ stackdriver. The following information may be collected, aggregated, visualized, etc., for example on a graphical user interface such as the graphical user interface 900: system health metrics, application health metrics, successful request/response counts from the downstream services, errors from downstream services, etc.

Figure 10:
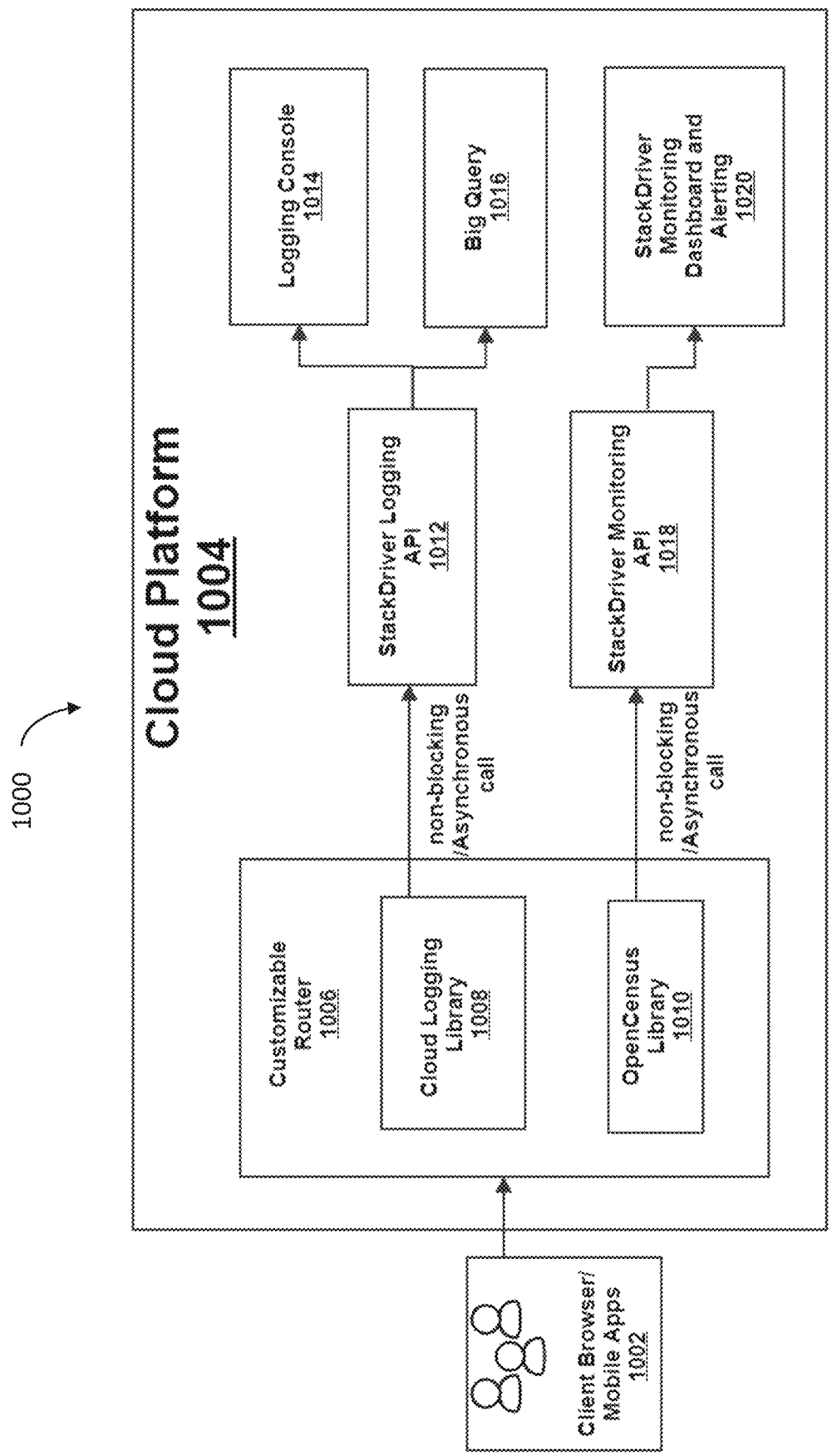
FIG. 10 is a schematic illustrating an example cloud platform for monitoring performance metrics of a customizable router, in embodiments.

FIG. 10 is a schematic illustrating an example cloud platform 1004 for monitoring performance metrics of a customizable router. A system 1000 of FIG. 10 includes client electronic device browser and mobile apps 1002 that are used to access websites, such as a website that utilizes customizable routers as described herein. Those websites may be stored on the cloud platform 1004 and include a customizable router 1006. The customizable router 1006 may be customizable as described herein to route traffic relating to website requests from the browser and mobile apps 1002.

The customizable router 1006 also includes a cloud logging library 1008 and an open census library 1010. The cloud logging library 1008 is an example of a client library that may be used to log activity of the customizable router 1006. A stackdriver logging API 1012 may be used to record data in a logged data, such as URI requests from the browser and mobile apps 1002, http status codes (e.g., 200, 404, 500), response times (e.g., time taken by server to respond/serve a request from a client electronic device), response byte sizes sent back to the browser and mobile apps 1002 in response to a URI request, etc. This logged data may be viewed through a logging console 1014 user interface that displays logged data. A big query tool 1016 provides an administrator with a tool to pull any desired logged data (e.g., relating to certain users or types/classes of users, relating to certain client electronic devices, relating to certain times of day, relating to certain microservice apps or app revisions, relating to certain experience apps or experimental features, relating to problematic responses such as those with long response times, etc.). The big query tool 1016 may be used for further analysis and measurements of logged data.

A metrics aggregator such as the open census library 1010 may also be used to push metrics to a data monitoring back end via a stackdriver monitoring API 1018. The stackdriver monitoring API 1018 may push desired data to a stackdriver monitoring dashboard and alerting 1020. Such data may be displayed on a user interface, for example the user interface 900 of FIG. 9. Such a user interface may be customized to display whatever tracked data of the customizable router 1006 an administrator desires.

Figure 11:
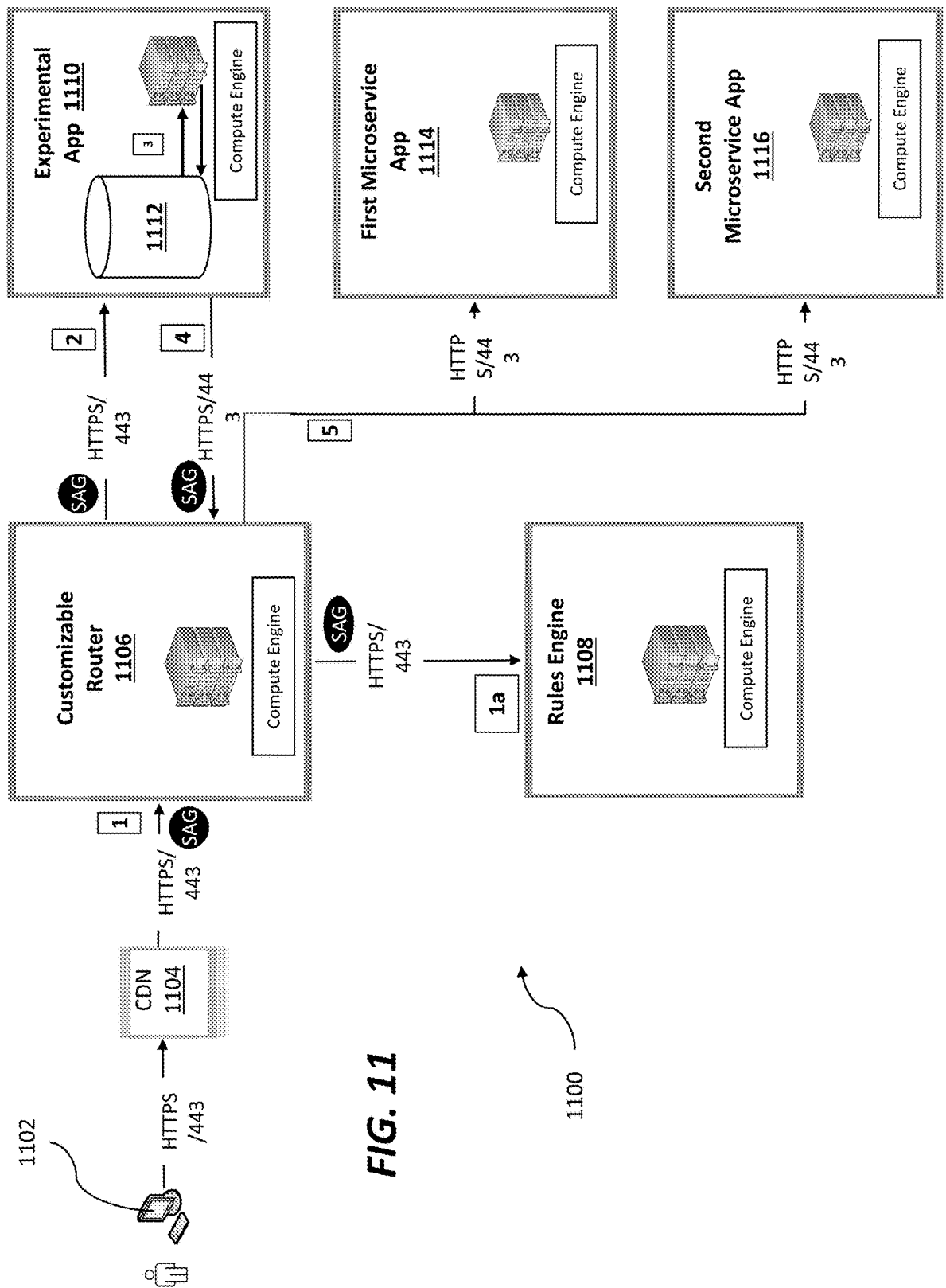
FIG. 11 is a schematic illustrating an example system for experiential/experimental routing of microservice app traffic, in embodiments.

FIG. 11 is a schematic illustrating an example system 1100 for experiential/experimental routing of microservice app traffic. The experiential/experimental system 1100 of FIG. 11 provides routing of microservice to different versions of experience apps to make experimental features of a website easier to implement, test on a desired number of users, etc., while still routing users who are not exposed to experimental features to desired revisions of microservice apps including various experience apps.

The system 1100 advantageously allows an administrator to set parameters for routing traffic. The parameters are highly configurable and customizable, so that various website services such as searching, automated recommendations, etc. may be exposed to different users. In other words, different traffic may be routed to different experience apps or app versions that have different features, visual characteristics, templates, models, recommendation or search algorithms, etc. to test an aspect of a website or otherwise provide a more valuable experience to an end user.

For example, parameters that may be set may include category-based parameters, item-based parameters, and/or customer segment parameters. A category-based parameter may cause a customizable router to route traffic based on various inclusion/exclusion criteria, such that some traffic is routed to an app version that is bound by the inclusion/exclusion criteria while other traffic is not. For example, when a particular category of products is requested by a user, the system may route the request to an app that excludes certain items of that category. For example, if a URI request is to view refrigerators, a routing to a microservice app that is applying an exclusion criteria may exclude refrigerators from the view of the user by any criteria such as style, brand, price, or any other criteria or combination thereof. This allows an administrator to test the behavior of users in a limited way when they are exposed to different experiences.

An item-based parameter may be an inclusion/exclusion of a particular item. For example, if a product is recently sold out or otherwise unavailable an administrator could quickly exclude an item from being displayed to a user via a parameter rule on that item. If an administrator wanted to push a particular item for sale, an inclusion based rule could be used to display that item to more users. An administrator may also desire to experiment with what users will buy if a particular item is displayed or not displayed. By using an item-based parameter with an inclusion/exclusion criterion, an administrator may expose any desired number of users to an experimental experience based on the parameter.

A customer segment may also be used to route traffic to different experience apps and/or to test experimental features. Certain customer segments may also be set to be included or excluded for certain features or apps. For example, an administrator may wish to expose business-to-business customers, homeowners, landlords, tradesman (or certain tradesman, e.g., plumbers, carpenters, electricians, etc.), etc. to different features, templates, etc. in different apps. In various embodiments, other types exclusion/inclusion criteria may also be used, such as client device type (e.g., mobile phone, desktop, tablet, etc.), geographic location, time of day, user identification/name, user demographic, user authentication information (e.g., whether a user is logged in or not, whether a user has higher/lower credentials/access than other users, etc.), etc.

Referring again to FIG. 11, at step one, client electronic devices 1102 send URI requests routed through a CDN 1104 to a customizable router 1106. Such URI requests may originate when a user visits a website and searches for a product, selects a product, selects a product category, etc. An administrator may set parameters or rules as described herein that are stored in a rules engine 1108. Although shown as a separate compute engine (e.g., server) in FIG. 11, the rules engine 1108 may, in various embodiments, exist within the customizable router 1106 servers. At a step 1a, the customizable router 1106 calls the rules engine 1108 to determine what rules/parameters to apply to a URI request (e.g., to make an experience-based routing decision).

The example of FIG. 11 includes an experimental app 1110 to which traffic is directed if a certain inclusion/exclusion criterion exists with respect to a URI request. For example, if a URI request is related to a home décor product category, the requests related to the URI request may be routed to the experimental app 1110, which is a type of experience app related to home décor. At a step 2, such a request is routed to the experimental app 1110. If the URI request does not meet the inclusion criteria to be sent to the experimental app 1110, the URI request is routed to a different experience app. At a step three, the experimental app 1110 processes the request related to the original URI request based on experience app data stored in the datastore 1112. The experience app data may be stored, for example, according to JavaScript Object Notation (JSON) in a cloud storage platform. This data is used by the experimental app 1110 to render the experience to back to the client electronic device 1102.

At a step four, the experimental app 1110 sends data requests for data used to render the experience back to the client electronic devices 1102. At step five, those requests are routed by the customizable router to other microservice apps (e.g., domain microservice apps) to retrieve additional information for fulfilling the original URI request from the client electronic devices 1002. Accordingly, various parameters may be used to advantageously route URI requests to experimentally test various features.

Figure 12:
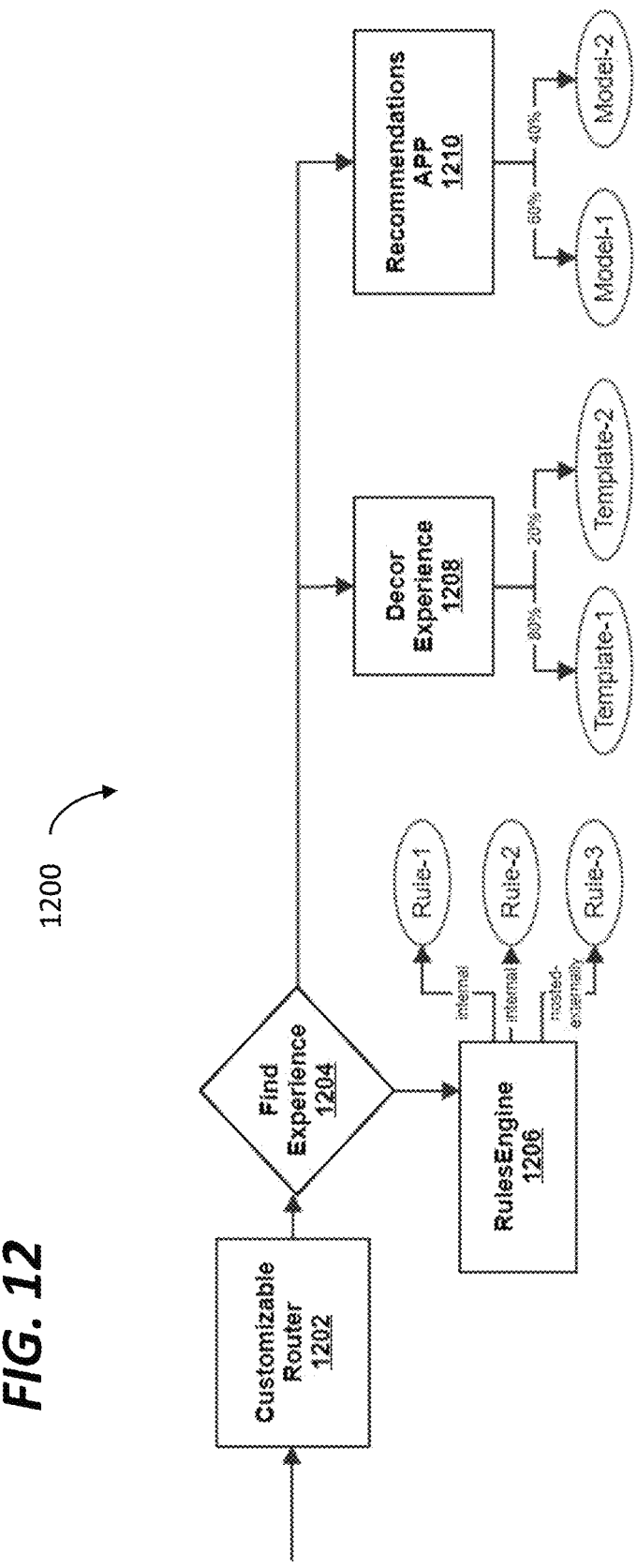
FIG. 12 is a schematic illustrating an example system for routing traffic to different templates of one or more experience apps, in embodiments.

FIG. 12 is a schematic illustrating an example system 1200 for routing traffic to different templates of one or more experience apps, in embodiments. The system 1200 includes a customizable router 1202. When a request comes into the customizable router 1202, the system 1200 finds the appropriate experience at block 1204 using a rules engine 1206.

The rule engine 1206 may include a plurality of rules based on different parameters (e.g., inclusion/exclusion criteria described above), such as rules one, two, and three. The rules may be hosted in different locations (e.g., rules one and two of FIG. 12 are hosted internally at the rules engine and rule three is hosted externally at another device). In this way, administrators may be able to change rules in different locations that are still referred to by the rules engine 1206.

Once the system determines the appropriate experience for a URI request at the block 1204, the request is routed to the appropriate experience. The example of FIG. 12 shows a home décor experience app 1208 and a recommendations app 1210 to which a request may be routed. In alternative embodiments, a request may be routed to both the décor experience app 1208 and the recommendations app 1210 if a URI request for a webpage requires both features. For requests sent to the décor experience app 1208, eighty percent (80%) of the traffic is routed to a first template of the décor experience app 1208, and twenty percent (20%) of the traffic is routed to a second template of the décor experience app 1208. Accordingly, weighted routing may also be incorporated with experiential/experimental app routing to further test new features, route traffic, etc. The décor experience app 1208 is an app that delivers a particular visual experience to a user. Thus, the templates one and two refer to different ways home décor information may be delivered to an interface of a client electronic device.

In contrast, the recommendations app 1210 is an app with an algorithm for how to recommend products to a user. The recommendations app 1210 includes two models for recommending products to a user. Accordingly, requests that arrive at the recommendations app 1210 may be sent sixty percent (60%) to a first model for determining recommendations and forty percent (40%) to a second model for determining recommendations. Accordingly, rules for both experiential/experimental routing may be applied as well as weighted routing rules. In alternative embodiments, instead of using weighted routing rules to direct traffic to the templates of the décor experience app 1208 and/or the recommendations app 1210, the system 1200 could use experiential/experimental parameters to apply inclusion exclusion based rules to direct traffic to different templates and/or models for various apps.

Figure 13:
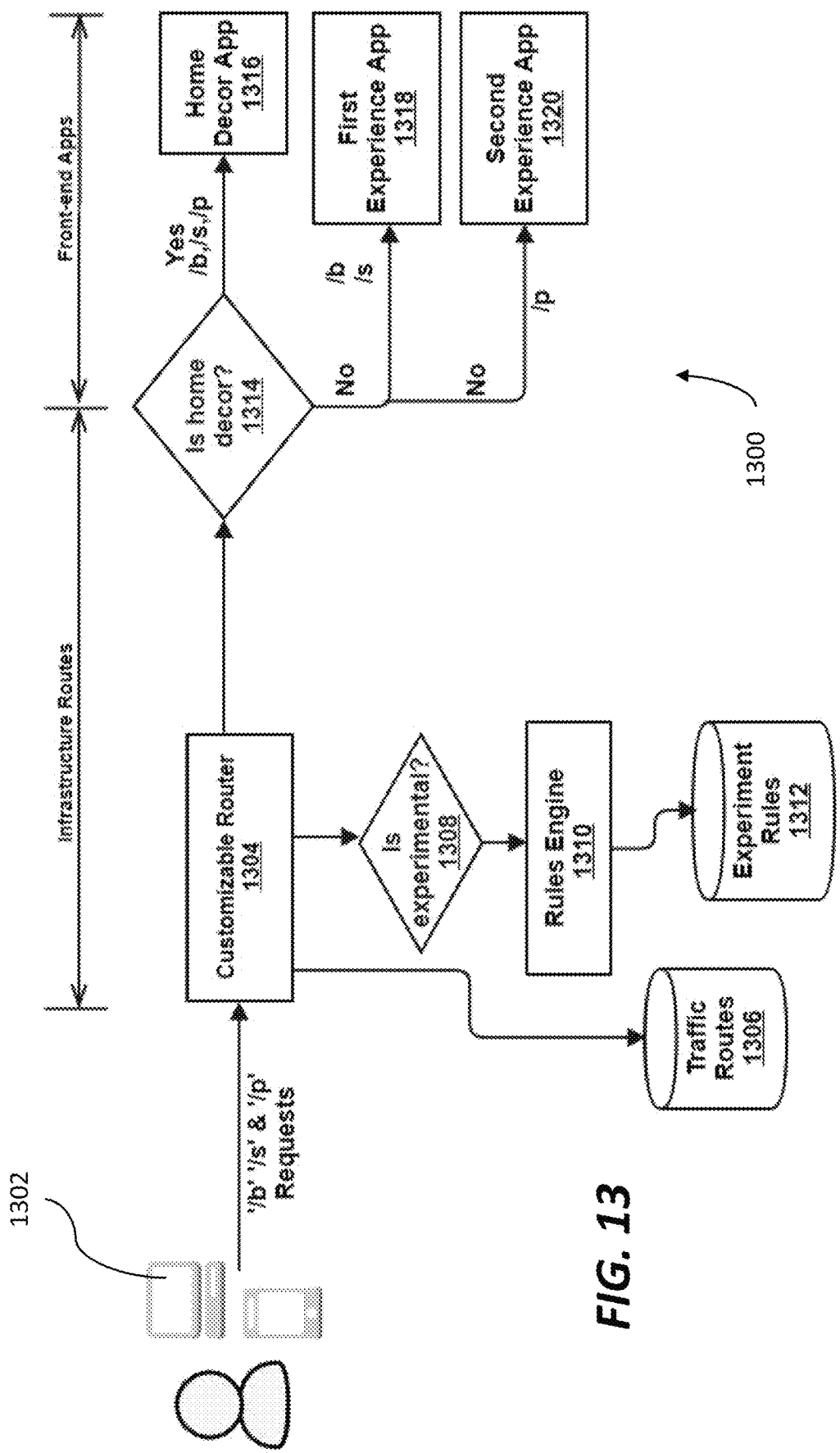
FIG. 13 is a schematic illustrating an example system for experiential/experimental routing of traffic between various experience apps, in embodiments.

FIG. 13 is a schematic illustrating an example system 1300 for experiential/experimental routing of traffic between various experience apps, in embodiments. The system 1300 includes client electronic devices 1302 that send different types of URI requests to the customizable router 1304. In the example of FIG. 13, those requests may include '/b' requests related to product listing pages, '/s' requests relating to search pages, and '/p' requests relating to product information pages. The system 1300 is configured with different rules to route requests of different types in different ways.

When the requests are processed by the customizable router 1304, the customizable router 1304 determines if an experimental parameter is present at block 1308. In other words, the customizable router 1304 with the rules engine 1310 determines if an experimental flag set by an administrator and saved in the experiment rules 1312 is enabled for a particular route. In the example of FIG. 13, the experimental flag is whether the request is related to home décor. In this example, each type of request (/b, /s, and /p) is subject to the experimental rule if the request is related to home décor. However, in other embodiments, a rule may be set to only apply to certain types of request (e.g., only /s type requests that are related to home décor). Also in other embodiments, multiple rules/parameters may be applied to route a URI request. In an example, a request may be routed to an experimental app only if the URI request is related to home décor and the device type making the request is a tablet computing device.

Based on the determination of whether an experimental rule applies, the customizable router 1304 will route the requests accordingly. For example, as shown at block 1314, for any request related to home décor is routed to the home décor app 1316. If a request is not related to home décor in the system 1300, it may be routed to a first experience app 1318 or a second experience app 1320 based on the type of request it is. For example, /b and /s requests (product listing page requests and search page requests) may be routed to the first experience app 1318 while /p requests (product information page requests) may be routed to the second experience app 1320. In this way, different routes may be applied by the customizable router 1304 depending on various parameters/aspects of a URI request. The routes to the first experience app 1318 and the second experience 1320 may be referred to as the default routes. The default routes may be stored and applied according to rules stored in the traffic routes 1306 of FIG. 13. Accordingly, application of the experimental rules 1312 is an exception to application of the traffic routes 1306 applied by default by the customizable router 1304.

Figure 14:
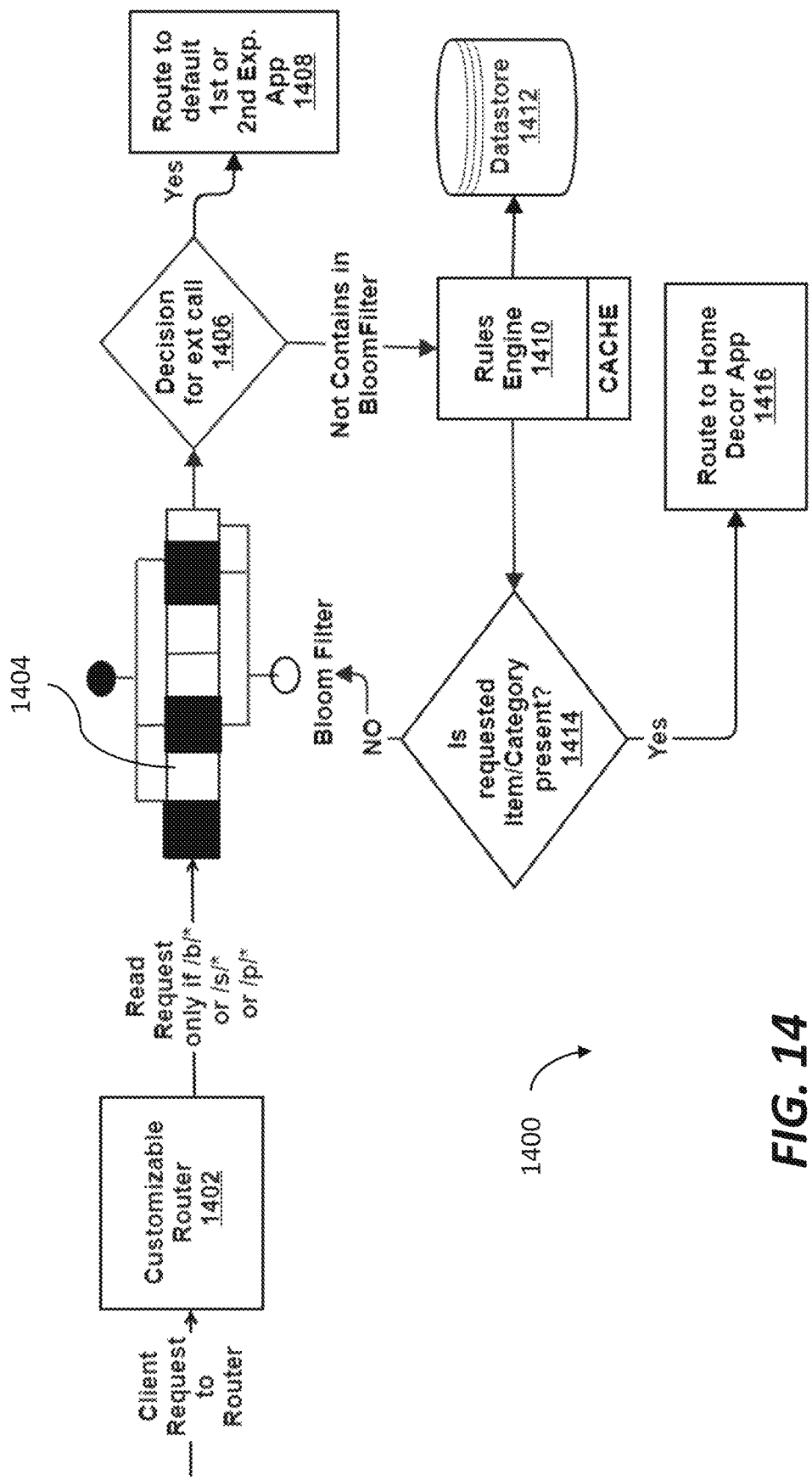
FIG. 14 is a schematic illustrating an example system for implementing a bloom filter in routing microservice app traffic, in embodiments.

FIG. 14 is a schematic illustrating an example system 1400 for implementing a bloom filter 1404 in routing microservice app traffic, in embodiments. The bloom filter 1404 may be utilized to speed up and make a customizable router 1402 more efficient. A bloom filter is a space-efficient probabilistic data structure that is used to test whether an element is a member of a set. With a bloom filter, false positives are possible, but false negatives are not possible. In other words, a bloom filter query may return values of "possibly in set" or "definitely not in set."

The bloom filter 1404 may therefore be used to determine whether a URI request is "possibly" in a set or group for which an experimental rule should be applied or is "definitely not" in a set or group for which an experimental rule should be applied. By applying the bloom filter 1404, URI requests which should "definitely not" have an experimental rule applied do not need to be run through a rules engine. Such a process will speed up performance of rules engines, as well as customizable routers, and therefore a system as a whole. This efficiency is gained because, when the rules engine need not be invoked, a default path may be followed for a particular URI request.

In FIG. 14, a request is sent from the customizable router 1402 through the bloom filter 1404, and at a block 1406 the decision is made whether to route the request to a default first or second experience app 1408 (e.g., when the URI request is "definitely not" part of an experimental set) or to a rules engine 1410 (e.g., when the URI request is "possibly" in an experimental set). In other words, at block 1406, a decision is made to proceed with calling external (to the customizable router 1402) microservice apps (such as the first or second experience apps at block 1408) or keep the request and consult the rules engine 1410. The bloom filter 1404, may, for example, include item identification numbers for which no experimental rule should be applied. Accordingly, the decision for an external call at the block 1406 is no when an item identification number relating to a URI request is not contained in the bloom filter. In various embodiments, data other than or in addition to an item identification number may be used in the bloom filter to determine whether to call a rules engine or route a request along a default route. For example, a product category identification number, identifying feature of a user, any other rule or parameter, or any combination thereof may be used by the bloom filter to filter requests before they are processed at the rules engine 1410.

If the rules engine 1410 is called at the block 1406, the customizable router 1402 determines the whether the request item/category is actually present at block 1414. That is, because the bloom filter may possibly have false positives, a request may be routed to the rules engine 1410 that is not actually a request related to an experimental parameter. In the example of FIG. 14, the block 1414 determines if the request is related to home décor. If so, the request is routed to the experimental home décor app at block 1416. If not, the request is routed back to the bloom filter 1404. However, the item identification number may be added to the bloom filter 1404 by the customizable router 1402. In this way, when the request is run through the bloom filter 1404 again, the bloom filter 1404 will properly determine that the request is "definitely not" part of an experimental group, and the customizable router 1402 with therefore route the request to a first or second default experience app at block 1408.

If a rule in the datastore 1412 is changed (e.g., an administrator updates or changes an experimental campaign), the updated rule may be sent to the customizable router 1402 so the customizable router 1402 may update its local routing rules and/or route tables. The updated rule may also be time stamped so the customizable router 1402 may verify that it is a more current version of a rule than its current route tables. The updated rule may also be used to reset or reconfigure the bloom filter upon route entry refresh so that the bloom filter continues to be accurately applied.

A rules engine that is part of an experimentation platform as described herein may include a computational model. The rules engine organizes logic through a set of production rules, each having a condition and an action. This may be simpler to apply than an imperative model, which includes many if-then statements. Various techniques may be used to specify rules by an administrator, such as an API for administrators to describe rules as Java objects, a domain-specific language (DSL) for an administrator to express rules, or a graphical user interface (GUI) that allows an administrator enter rules. More efficient execution engines help to quickly evaluate conditions on hundreds of rules using specialized algorithms (such as a Rete algorithm).

Having a rules engine separate from the other embodiments of a customizable router described herein is advantageous. For example, a rules engine may be used to separate business rules from application logic. For example, an application logic may be used to roll out a new version of a microservice app that fixes technical bugs, while rules of a rules engine may be used by a business team to experiment with different features of a website such as colors, themes, search algorithms, pricing, etc. that may already be developed by a technical team. A business logic for experimenting with various aspects may begin to become quite cluttered with multiple if conditions and outcomes for routing traffic. Separating out the experimental rules from application logic allows a different method for one group of administrators to apply and update experimental rules in the rules engine versus a second group of administrators that may implement more complex routing rules for a customizable router to implement. Such bifurcation of rule setting provides for the ability to set complex experimental rules in a way that would not interfere with default rules already set. In an example, MVFLEX Expression Language (MVEL) may be used as an expression language for expressing rules stored in a rules engine. MVEL is a dynamically-typed expression language (rule modeling framework). The expression language may be dynamically accessed data from JavaBeans, which includes serializable classes with private properties and getters/setters.

Figure 15:
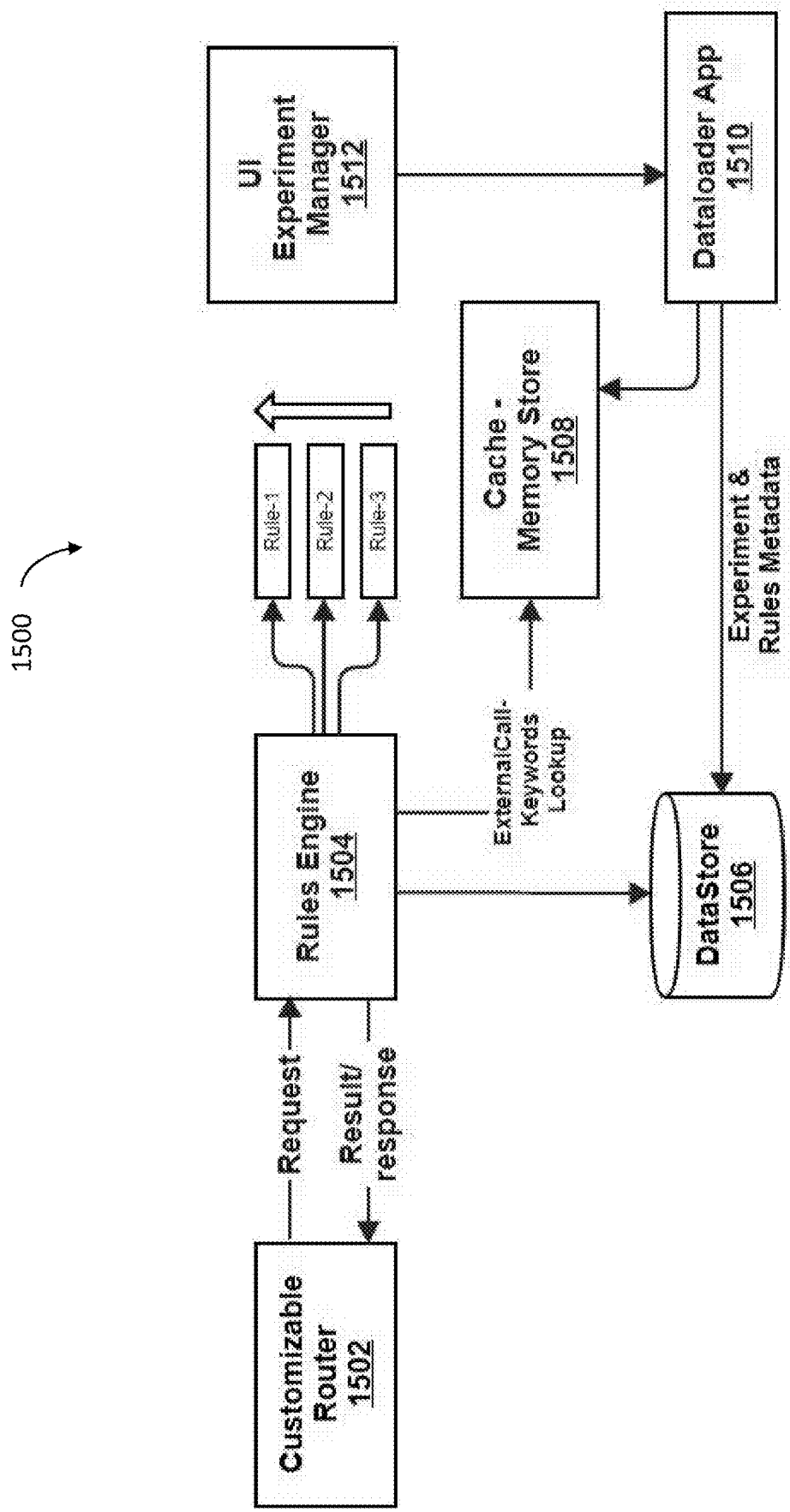
FIG. 15 is a schematic illustrating an example system for a rules engine that operates in conjunction with a customizable router to route microservice app traffic, in embodiments.

FIG. 15 is a schematic illustrating an example system 1500 for a rules engine that operates in conjunction with a customizable router 1502 to route microservice app traffic. The system 1500 also provides for an administrator to update a rule stored in a rules engine 1504. If an experimental flag associated with a request is enabled, the customizable router 1502 requests the rules engine 1504 to determine rules (e.g., rules one, two, three) that apply and execute any campaign associated with a request. The rules one, two, and three may be evaluated based on a priority level of the rules. Once the rules engine 1504 has applied the rules, a result/response is returned to the customizable router 1502 for routing to the various applicable apps.

A user interface (UI) experiment manager 1512 may be used by an administrator to update, change, remove, add, etc. rules for an experiment. The UI experiment manager may include a graphical user interface (GUI) or some other input method for an administrator to input rule updates, changes, removes, adds, etc. As described herein, those rules may be in the form of various types of inclusion/exclusion criteria. That rule information is then sent from the UI experiment manager 1512 to a dataloader app 1510 which loads the new rule into a cache-memory store 1508 of the rules engine 1504 and the datastore 1506 of the rules engine. The UI experiment manager 1512 may utilize CRUD (create/read/update/delete) endpoints to cascade category/items offline (e.g., using MVEL expressions). The read function may be utilized to deliver current configurations of rules to the UI experiment manager 1512 interface. The rules engine 1504 may look up applicable rules, including any updated or new rules by sending external call keywords to lookup in the cache-memory store 1508. Accordingly, using the system 1500, rules may be easily updated by an administrator to be applied by the rules engine 1504 and the customizable router 1502.

Figure 16:
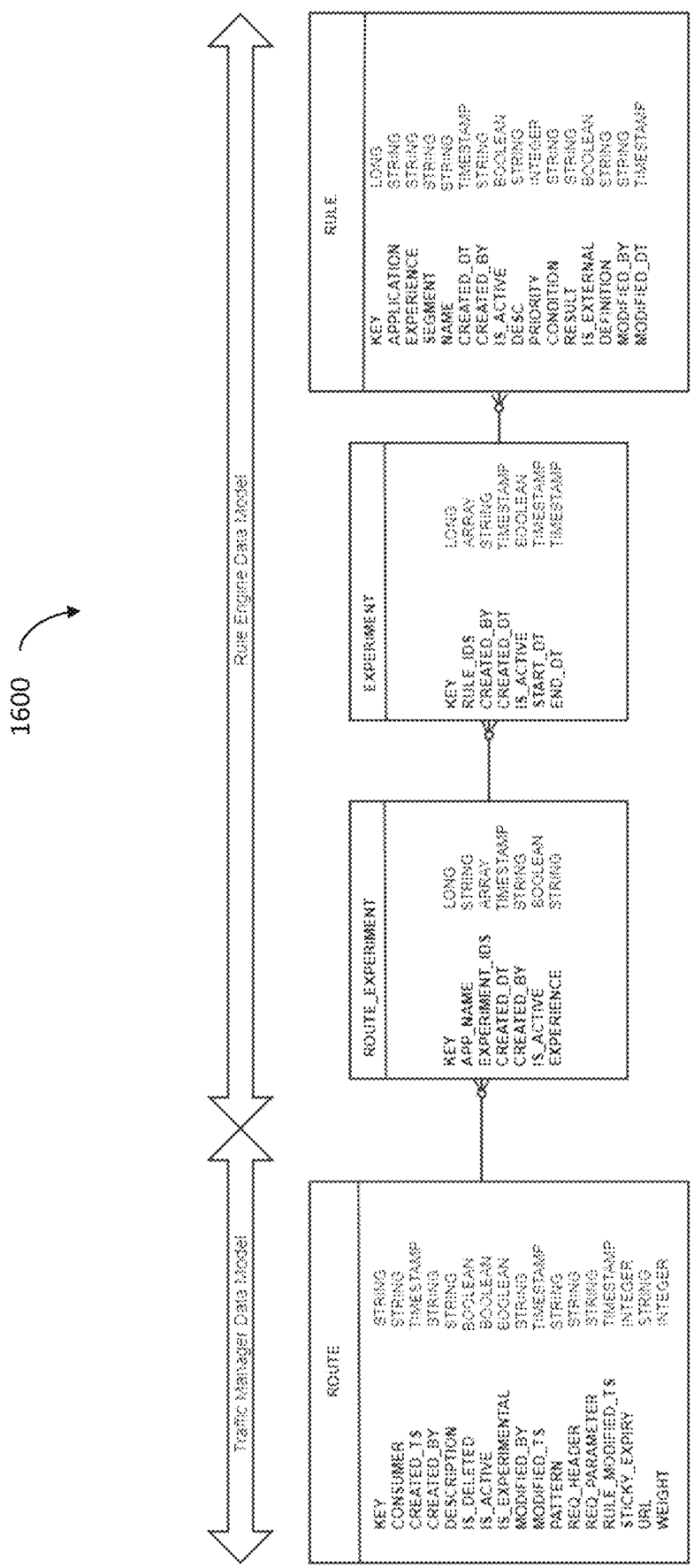
FIG. 16 illustrates an example hierarchical data model for storing rules of a rule engine, in embodiments.

FIG. 16 illustrates an example hierarchical data model for storing rules of a rule engine, in embodiments. FIG. 16 shows how customizable routers and various aspects of a rule engine may use similar data models and properties so that microservice apps may be grouped according to common properties, and requests may be more efficient routed to those various microservice apps. Various parent routes may have multiple children routes sharing similar (parent level) properties or overridden properties at an individual child route level. In FIG. 16, an ultimate route applied by a traffic manager has a data model that shares properties with the types of data stored and applied by a rules engine for experimental/experiential routing. That information includes route information for particular experiments, information about particular experiments, and rules for applying the experiments and an experiment's routing.

Figure 17:
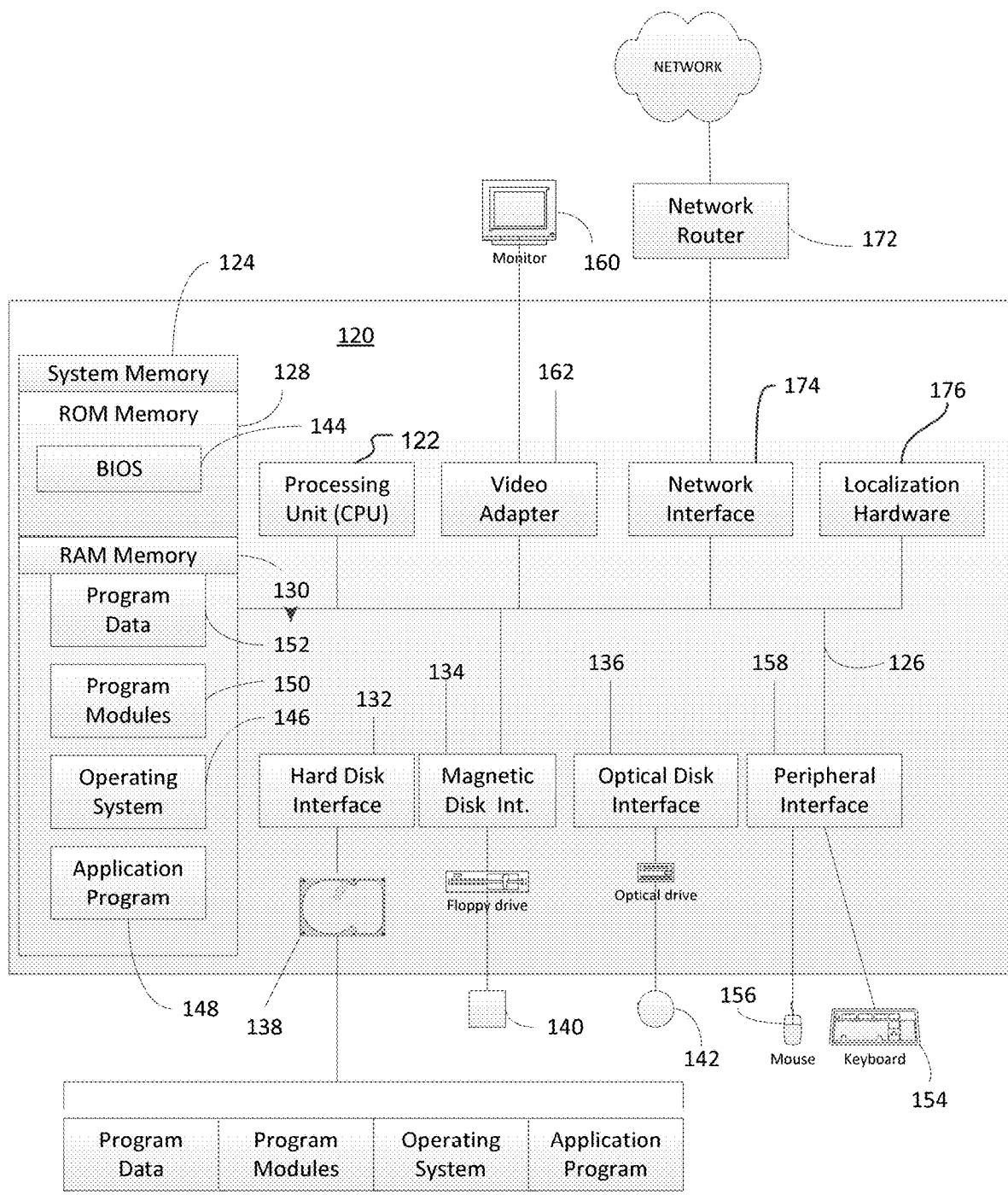
FIG. 17 is a diagrammatic view of an example computing system, according to some embodiments.

FIG. 17 is a diagrammatic view of an example computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, system administrator, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method, comprising:
   determining a first microservice application of a plurality of microservice applications to which to send a microservice request in response to a uniform resource indicator (URI) request for a webpage of a website from a client electronic device, wherein the first microservice application has at least a first version and a second version;
   determining a rule applicable to the first microservice application; and
   routing the microservice request associated with the URI request to one of the first version or the second version based on the rule.

2. The method of claim 1, further comprising:
   receiving, from the first microservice application, information responsive to the microservice request; and
   sending, to the client electronic device for display on an electronic graphical user interface, the information responsive to the microservice request.

3. The method of claim 1, further comprising:
   determining that a plurality of microservice requests should be sent to the first microservice application of the plurality of microservice applications in response to a plurality of URI requests;
   routing a first subset of the plurality of microservice requests associated with a first subset of the plurality of URI requests to the first version of the first microservice application based on the rule; and
   routing a second subset of the plurality of microservice requests associated with a second subset of the plurality of URI requests to the second version of the first microservice application based on the rule.

4. The method of claim 3, wherein the rule specifies that a first predetermined number or percentage of the plurality of microservice requests should be routed to the first version of the first microservice application and further wherein the rule specifies that a second predetermined number or percentage of the plurality of microservice requests should be routed to the second version of the microservice application.

5. The method of claim 1, wherein the URI request is a first URI request, the microservice request is a first microservice request, the webpage is a first webpage, and wherein the method further comprises:
   storing an identifier associated with the client electronic device along with rule application data indicating a version to which the first microservice request associated with the first URI request from the client electronic device was routed;
determining, based on the stored identifier and the rule application data, the version to which the first microservice request was routed based on the identifier; and
routing a second microservice request associated with a second URI request for a second webpage of the website to the version to which the first microservice request was routed.

6. The method of claim 5, wherein the first webpage and the second webpage are the same webpage of the website.

7. The method of claim 5, wherein the first webpage and the second webpage are different webpages of the website.

8. The method of claim 1, wherein:
determining the rule further comprises determining a characteristic associated with the client electronic device, a user account associated with the client electronic device, or a user associated with the client electronic device; and
routing the microservice request further comprises routing the microservice request to the first version or the second version based on the determined characteristic, the user account associated with the client electronic device, or the user associated with the client electronic device.

9. The method of claim 8, wherein the characteristic comprises at least one of a client electronic device type; a geographic location of the client electronic device; an association of the client electronic device, the user account, or a presumed user with an organization or business; an estimated income associated with the client electronic device, the user account, or the presumed user; an employer associated with the client electronic device, the user account, or the presumed user; or past traffic history associated with the client electronic device, the user account, or the presumed user.

10. The method of claim 1, wherein:
determining the rule further comprises:
determining a header associated with the URI request;
determining an experience application associated with the header, wherein the first version and the second version are each versions of the experience application;
determining a rule that is associated with the experience application; and
routing the microservice request comprises routing the microservice request to the first version or the second version based on the determined rule that is associated with the experience application.

11. The method of claim 1, wherein the rule is a first rule, the microservice request is a first microservice request, and further wherein the first microservice application sends a second microservice request to a second microservice application of the plurality of microservice applications according to a second rule.

12. The method of claim 1, wherein:
the first version of the microservice application is associated with one or more servers in a first geographic region; and
the second version of the microservice application is associated with one or more servers in a second geographic region.

13. The method of claim 12, wherein the rule is determined based on a performance of the one or more servers in the first geographic region compared to the one or more servers in the second geographic region.

14. The method of claim 1, wherein the rule is determined based on a performance of the first version of the microservice application compared to the second version of the microservice application.

15. A method, comprising:
determining a first microservice application of a plurality of microservice applications to which to send a first microservice request in response to a first uniform resource indicator (URI) request for a webpage of a website from a client electronic device, wherein the first microservice application has at least a first version and a second version;
determining a rule applicable to the first microservice application, wherein microservice requests are routed to the first version or the second version of the first microservice application based on the rule;
routing the first microservice request associated with the first URI request to one of the first version or the second version based on the rule;
receiving, from an administrator electronic device via a graphical user interface, a change to the rule adjusting how the microservice requests are routed to the first version or the second version of the first microservice application such that the rule is a changed rule; and
routing a second microservice request associated with a second URI request for the webpage of the website to one of the first version or the second version based on the changed rule.

16. The method of claim 15, wherein the change to the rule comprises an adjustment to a percentage of the microservice requests that are sent to the first version and the second version.

17. The method of claim 15, wherein the change to the rule comprises an adjustment to how microservice requests are routed based on a characteristic associated with the client electronic device, a user account associated with the client electronic device, or a presumed user associated with the client electronic device.

18. The method of claim 15, wherein the change to the rule comprises adjusting how microservice requests are routed based on relative performance of one or more servers in a first group compared to one or more servers in a second group.

19. A method, comprising:
determining a first microservice application of a plurality of microservice applications to which to send a microservice request in response to a first uniform resource indicator (URI) request for a webpage of a website from a client electronic device, wherein the first microservice application has at least a first version;
routing the first microservice request associated with the first URI request to the first version of the first microservice application;
receiving a second version of the first microservice application;
receiving, from an administrator electronic device via a graphical user interface, a rule for routing microservice requests to the first version or the second version of the first microservice application; and
routing a second microservice request associated with a second URI request for the webpage of the website to one of the first version or the second version based on the rule.

20. The method of claim 19, further comprising:
receiving a third version of the first microservice application;

receiving, from the administrator electronic device via the graphical user interface, a change to the rule adjusting how the microservice requests are routed to the first version, the second version, or the third version of the first microservice application such that the rule is a changed rule; and routing a third microservice request associated with a third URI request for the webpage of the website to one of the first version, the second version, or the third version of the first microservice application based on the changed rule.

\* \* \* \* \*